United States Patent
Cho et al.

(10) Patent No.: US 9,787,890 B2
(45) Date of Patent: Oct. 10, 2017

(54) MOBILE TERMINAL AND METHOD OF CONTROLLING THE SAME

(71) Applicant: LG ELECTRONICS INC., Seoul (KR)

(72) Inventors: Kyungmin Cho, Seoul (KR); Seongik Jeon, Seoul (KR); Minah Song, Seoul (KR); Chansoo Kim, Seoul (KR); Seoyong Park, Seoul (KR); Jeonghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/495,616

(22) Filed: Sep. 24, 2014

(65) Prior Publication Data
US 2015/0334291 A1  Nov. 19, 2015

(30) Foreign Application Priority Data
May 19, 2014  (KR) .................. 10-2014-0059902

(51) Int. Cl.
*H04N 5/222*  (2006.01)
*G06F 3/041*  (2006.01)
(Continued)

(52) U.S. Cl.
CPC ..... *H04N 5/23216* (2013.01); *G06F 3/03547* (2013.01); *G06F 3/0412* (2013.01);
(Continued)

(58) Field of Classification Search
CPC .......... H04N 5/23293; H04N 5/23216; H04N 5/23245
(Continued)

(56) References Cited

U.S. PATENT DOCUMENTS

2004/0189856 A1  9/2004  Tanaka
2009/0115863 A1*  5/2009  Lee .................. G06F 3/04845
                                                348/222.1
(Continued)

FOREIGN PATENT DOCUMENTS

EP  1 462 921 A2  9/2004

OTHER PUBLICATIONS

Burger, "Single Touch Zoom Gestures on a Mobile Device," Ludwig-Maximilians-Universität München, Sep. 30, 2010, XP55169478A, pp. 1-21 (33 pages).
(Continued)

*Primary Examiner* — Xi Wang
(74) *Attorney, Agent, or Firm* — Birch, Stewart, Kolasch & Birch, LLP

(57) ABSTRACT

A mobile terminal including a wireless communication unit configured to perform wireless communication; a camera configured to obtain an image; a display unit configured to display a preview image obtained through the camera; and a controller configured to control the display unit to operate in any one of a first state in which a graphic object relating to an image capturing function is displayed overlapping the preview image and a second state in which the graphic object is not displayed while the preview image is displayed, based on a user request, and when a first pre-set type of touch is sensed in a region on which the preview image is displayed in the second state, control the camera to capture the preview image based on the pre-set type of touch.

20 Claims, 28 Drawing Sheets

(51) Int. Cl.
*H04N 5/232* (2006.01)
*G06F 3/0354* (2013.01)
*H04N 5/77* (2006.01)
*G06F 3/0484* (2013.01)
*G06F 3/0488* (2013.01)
*G06F 3/0481* (2013.01)
*H04N 101/00* (2006.01)

(52) U.S. Cl.
CPC .......... *G06F 3/0416* (2013.01); *G06F 3/0488* (2013.01); *G06F 3/04817* (2013.01); *G06F 3/04845* (2013.01); *G06F 3/04883* (2013.01); *G06F 3/04886* (2013.01); *H04N 5/23212* (2013.01); *H04N 5/23293* (2013.01); *H04N 5/772* (2013.01); *G06F 2203/04101* (2013.01); *G06F 2203/04104* (2013.01); *G06F 2203/04808* (2013.01); *H04N 2101/00* (2013.01)

(58) Field of Classification Search
USPC ............ 348/333.01, 333.02, 333.11, 333.12; 455/566; 345/173
See application file for complete search history.

(56) References Cited

U.S. PATENT DOCUMENTS

| | | | | |
|---|---|---|---|---|
| 2009/0303257 | A1* | 12/2009 | Yamaguchi | G06F 3/0482 345/667 |
| 2010/0141812 | A1* | 6/2010 | Hirota | H04N 9/045 348/279 |
| 2010/0156941 | A1* | 6/2010 | Seung | G06F 3/04847 345/660 |
| 2010/0173678 | A1* | 7/2010 | Kim | H04N 5/23216 455/566 |
| 2010/0317410 | A1* | 12/2010 | Song | G06F 3/04886 455/566 |
| 2011/0300910 | A1* | 12/2011 | Choi | G06F 3/0482 455/566 |
| 2012/0307126 | A1* | 12/2012 | Bhogal | H04N 5/23206 348/333.11 |
| 2013/0070112 | A1 | 3/2013 | Yoshizawa | |
| 2013/0215313 | A1* | 8/2013 | Maeda | H04N 5/23216 348/333.02 |
| 2013/0342747 | A1* | 12/2013 | Park | H04N 5/23212 348/333.11 |
| 2014/0036131 | A1 | 2/2014 | Wang et al. | |
| 2014/0078371 | A1 | 3/2014 | Kinoshita | |
| 2014/0195947 | A1* | 7/2014 | Yang | G06F 3/0486 715/769 |
| 2014/0320625 | A1* | 10/2014 | Alkouby | H04N 5/232 348/79 |

OTHER PUBLICATIONS

Kammer, "Formalization of Gestural Input for Multitouch-Systems," Technische Universität Dresden, Sep. 1, 2013, XP55220145A, pp. 1- 12 (14 pages).

* cited by examiner (a)   (b)

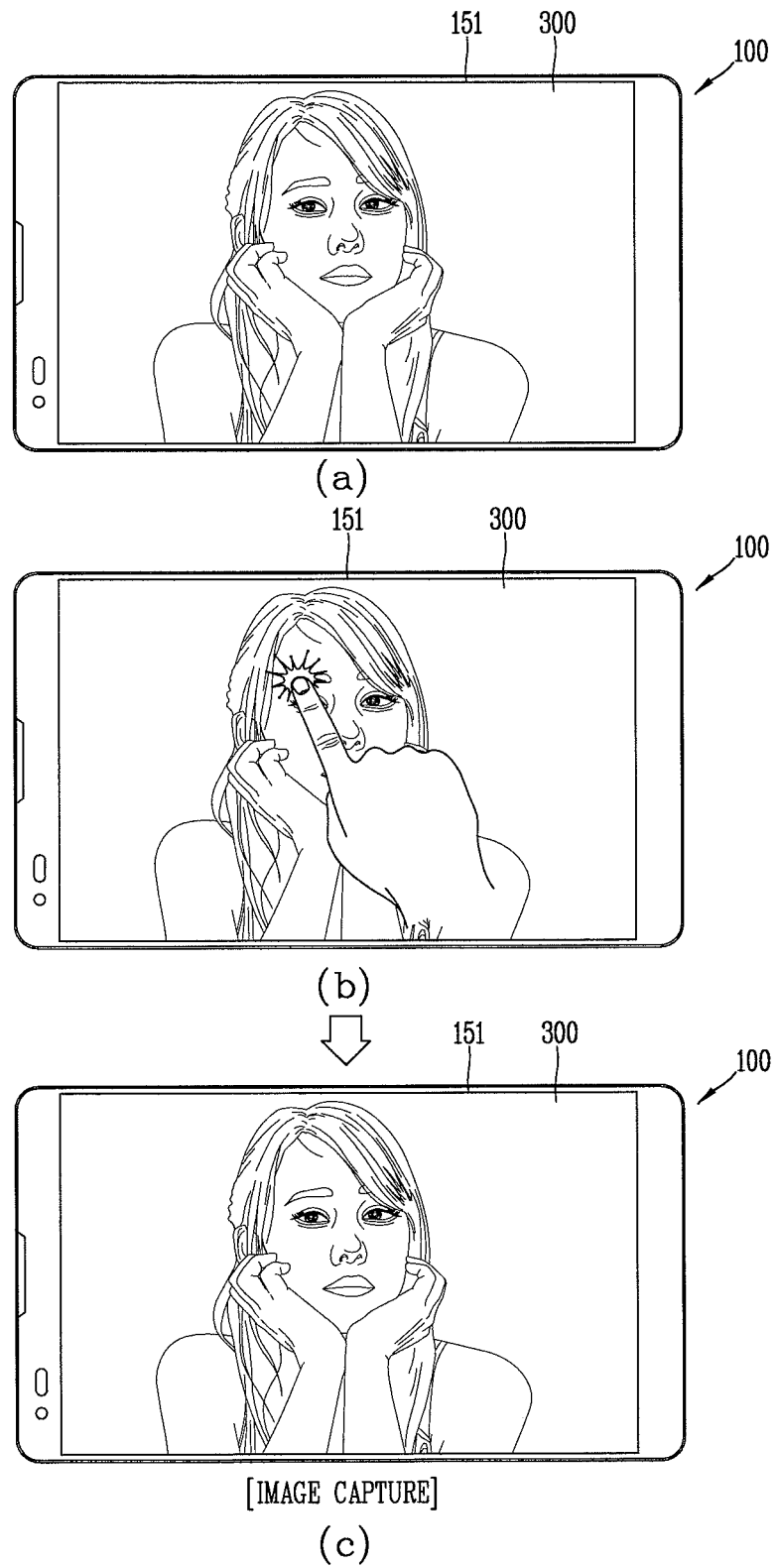

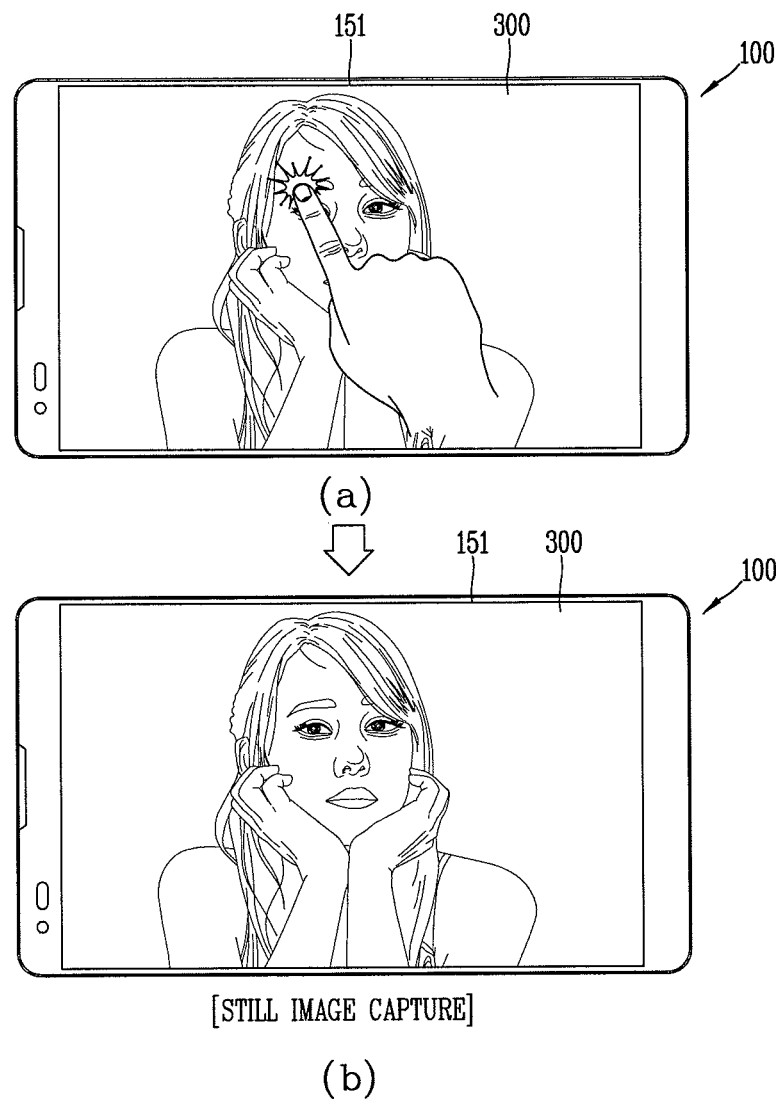

FIG. 5D
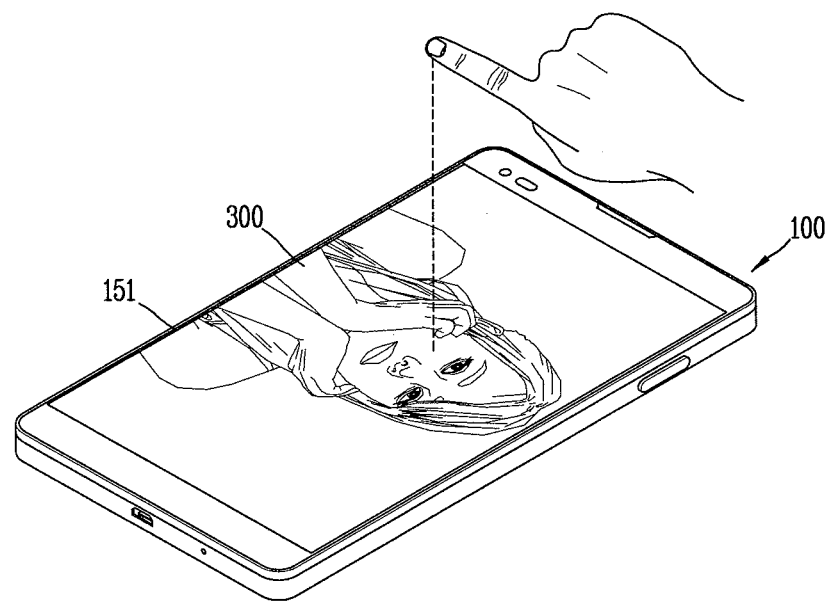
(a)
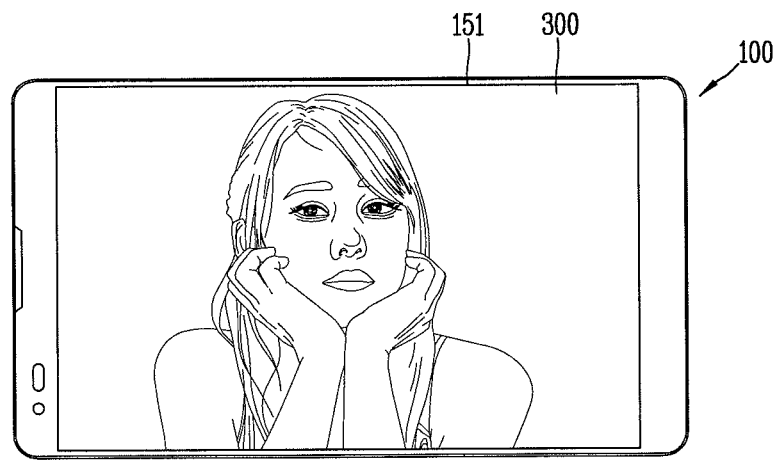
[IMAGE CAPTURE]
(b)

[CAPTURE IN FIRST IMAGE CAPTURING MODE]

FIG. 6F
(a)
[CAPTURE STILL IMAGE AFTER ADJUSTING FOCUS]
(b)
[CAPTURE STILL IMAGE IMMEDIATELY]
(c)

FIG. 6G
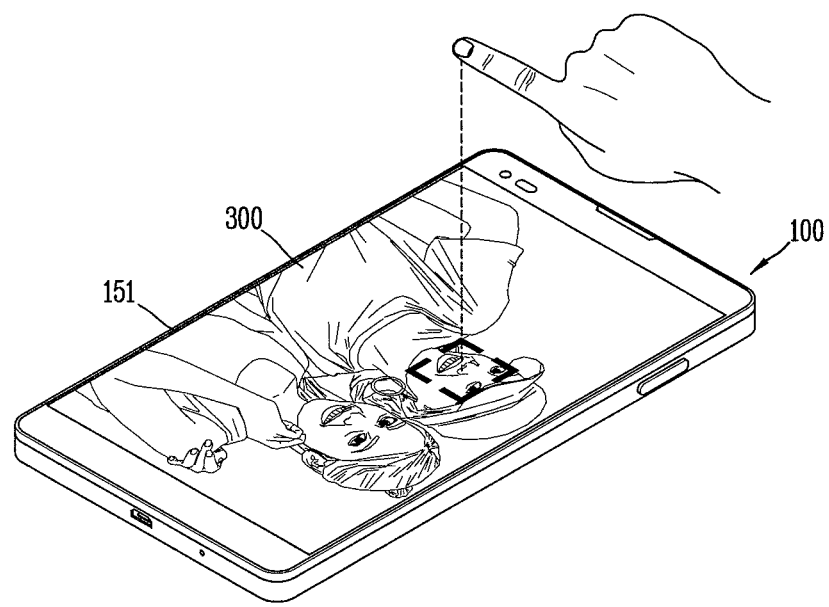
(a)
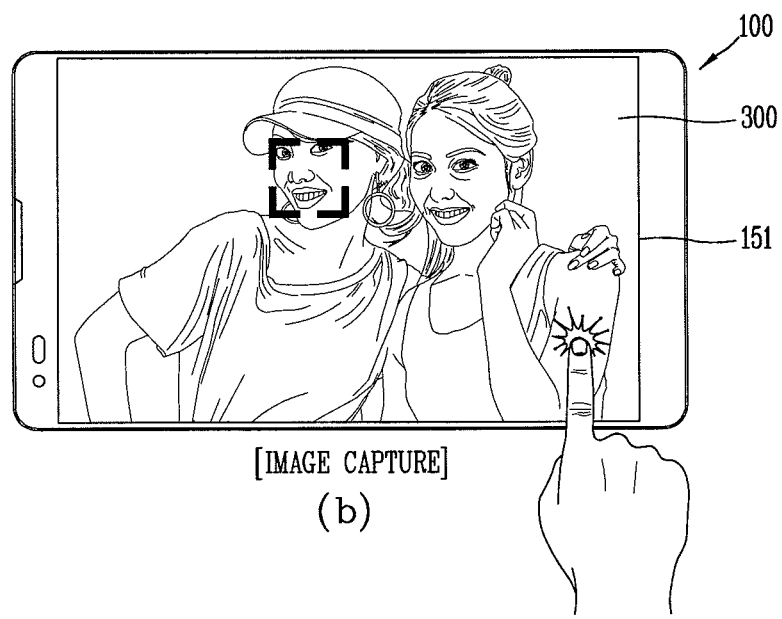
[IMAGE CAPTURE]
(b)

(a)　　　　　　　　(b)

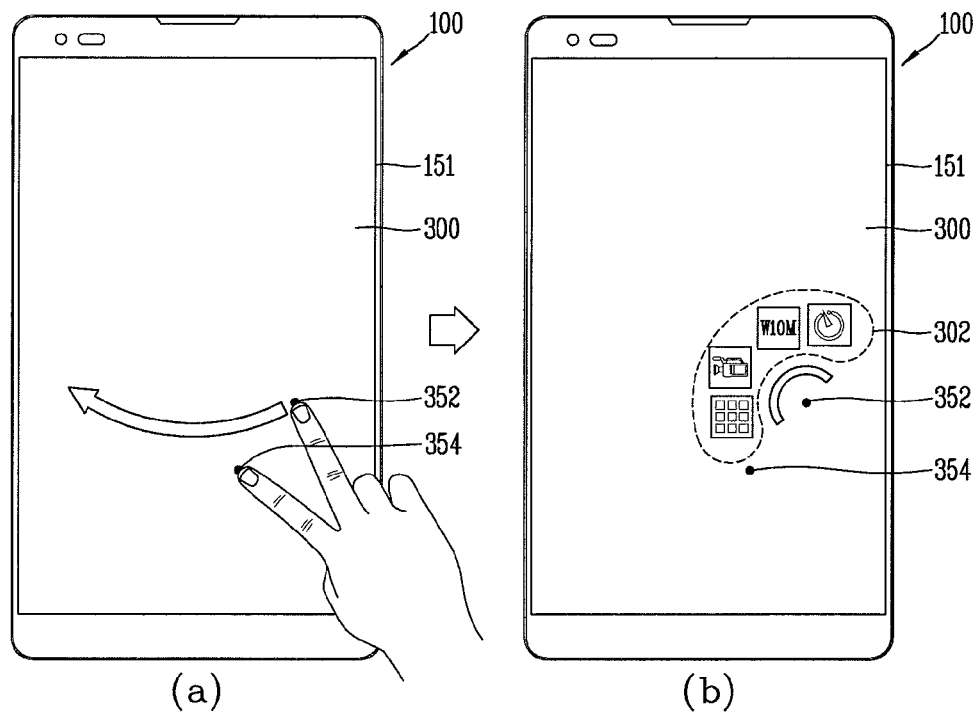

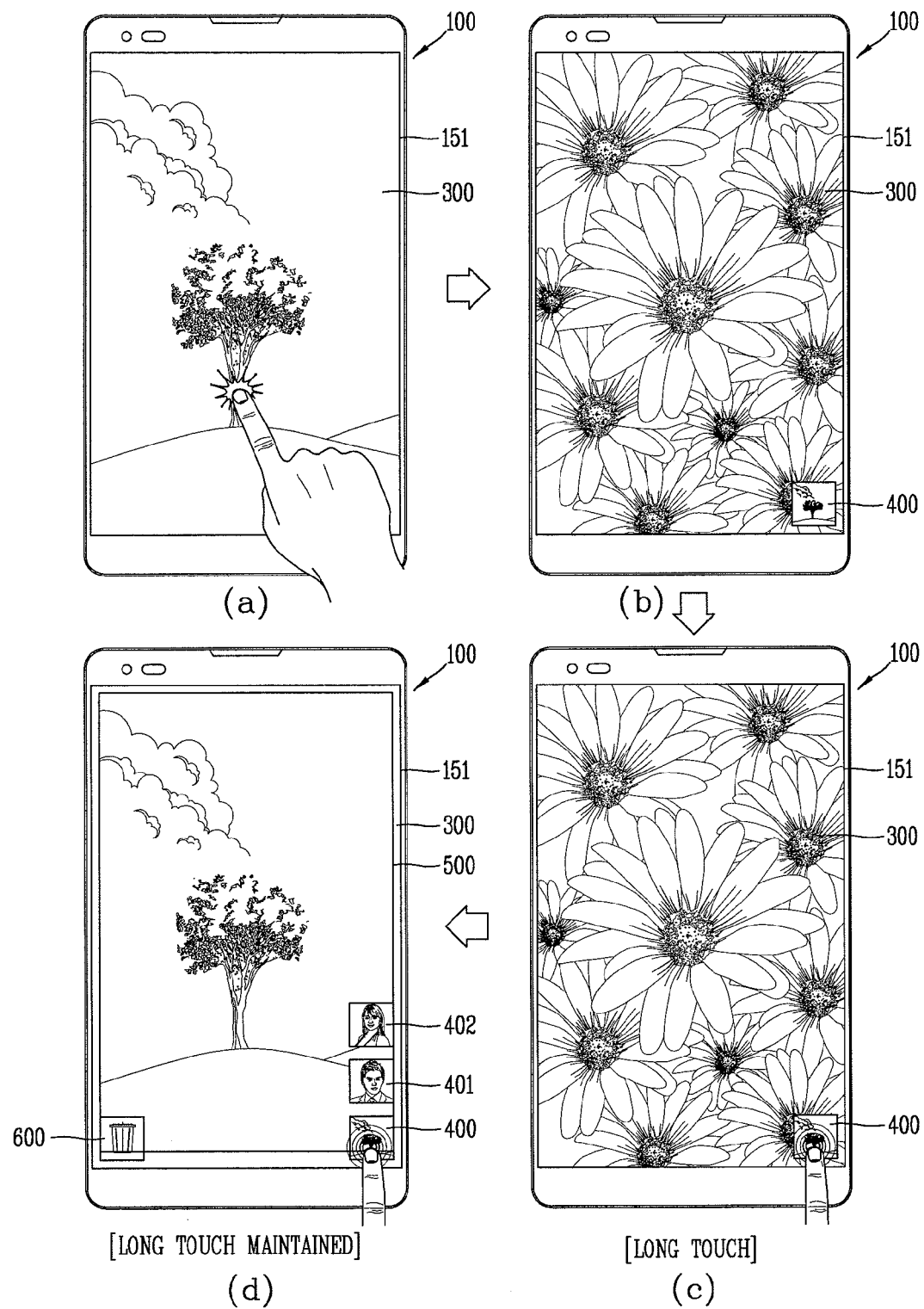

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2014-0059902, filed on May 19, 2014, the contents of which is incorporated by reference herein in its entirety.

BACKGROUND OF THE INVENTION

1. Field of the Invention

The present invention relates to a mobile terminal having an image capturing function and a method of controlling the same.

2. Background of the Invention

Terminals may be generally classified as mobile/portable terminals or stationary terminals. Mobile terminals may also be classified as handheld terminals or vehicle mounted terminals. Further, mobile terminals have become increasingly more functional. Examples of such functions include data and voice communications, capturing images and video via a camera, recording audio, playing music files via a speaker system, and displaying images and video on a display. Some mobile terminals include additional functionality such as game playing, while other terminals are configured as multimedia players.

A user interface environment is also provided allowing users to easily and conveniently search for or select functions. Also, recently, as resolution and functions of cameras provided in mobile terminals have enhanced, utilization of cameras provided in mobile terminals has increased. However, the functions and interface of the camera are limited and sometimes inconvenience the user.

SUMMARY OF THE INVENTION

Accordingly, one object of the present invention is to address the above-noted and other problems of the related art.

Another object of the present invention is to provide a mobile terminal and corresponding method for providing a graphic user interface (GUI) related to optimized image capturing.

Another object of the present invention is to provide a mobile terminal and corresponding method for providing an image capturing function where the user can simply touch a preview image.

To achieve these and other advantages and in accordance with the purpose of this specification, as embodied and broadly described herein, the present invention provides in one aspect a mobile terminal including a wireless communication unit configured to perform wireless communication; a camera configured to obtain an image; a display unit configured to display a preview image obtained through the camera; and a controller configured to control the display unit to operate in any one of a first state in which a graphic object relating to an image capturing function is displayed overlapping the preview image and a second state in which the graphic object is not displayed while the preview image is displayed, based on a user request, and when a first pre-set type of touch is sensed in a region on which the preview image is displayed in the second state, control the camera to capture the preview image based on the pre-set type of touch.

In another aspect, the present invention provides a method of controlling a mobile terminal, and which includes displaying, via a display unit of the mobile terminal, a preview image obtained through a camera of the mobile terminal; controlling, via a controller of the mobile terminal, the display unit to operate in any one of a first state in which a graphic object relating to an image capturing function is displayed overlapping the preview image and a second state in which the graphic object is not displayed while the preview image is displayed, based on a user request; and when a first pre-set type of touch is sensed in a region on which the preview image is displayed in the second state, controlling, via the controller, the camera to capture the preview image based on the pre-set type of touch.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 4 is a conceptual view illustrating the control method of FIG. 3;

FIGS. 5A to 5D are conceptual views illustrating a method of controlling an image capturing function variously based on various touches;

FIGS. 6A to 6G are conceptual views illustrating a method of adjusting focus with respect to a preview image utilizing touches applied to a display unit;

FIGS. 8A to 8C are conceptual views illustrating another embodiment of switching from a second state in which outputting of a graphic object is limited to a first state in which a graphic object is output;

FIGS. 9A to 9E are conceptual views illustrating a method of checking images captured in the second state in which outputting of a graphic object is limited.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
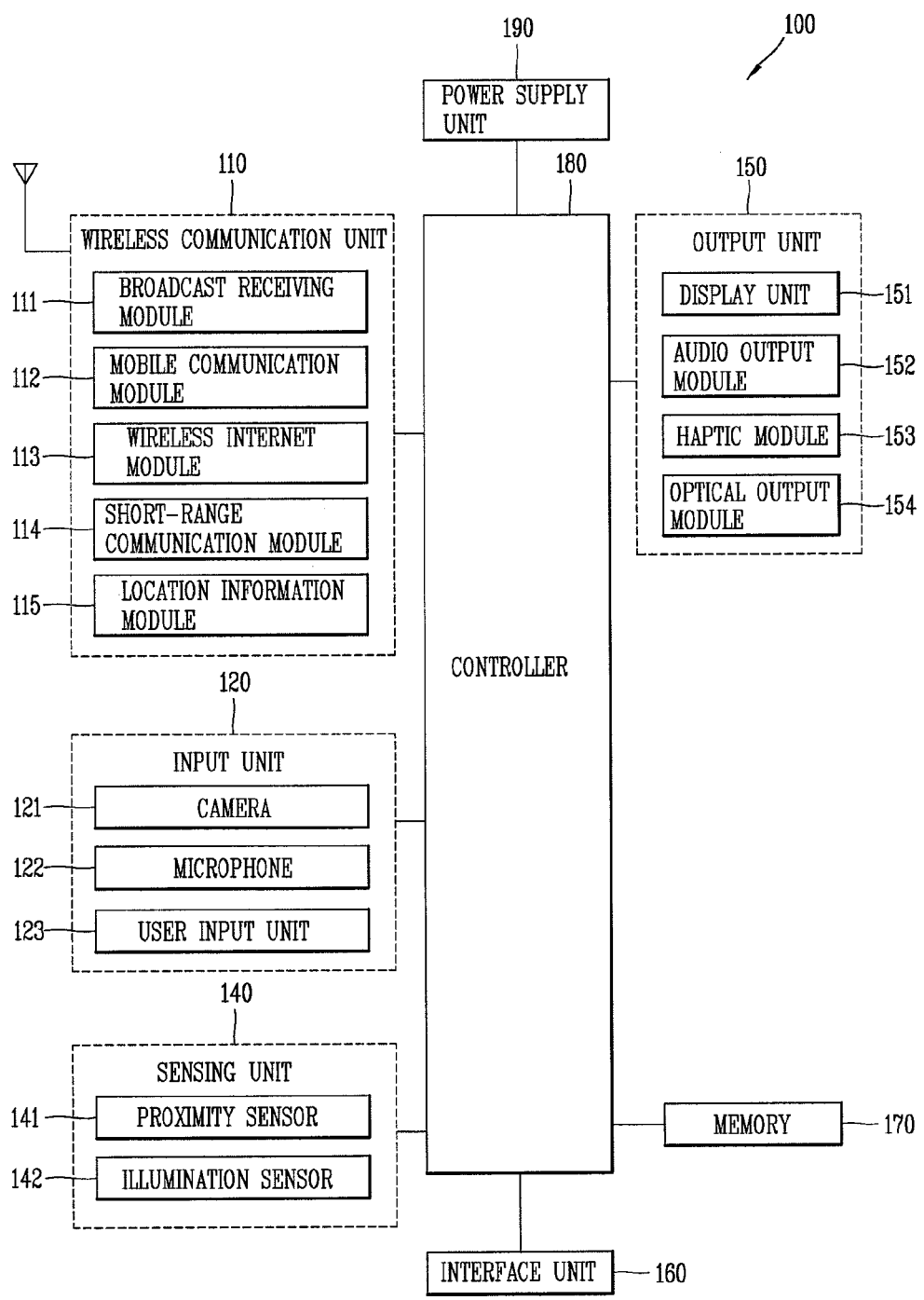
FIG. 1A is a block diagram of a mobile terminal according to an embodiment of the present invention.
Figure 1B:
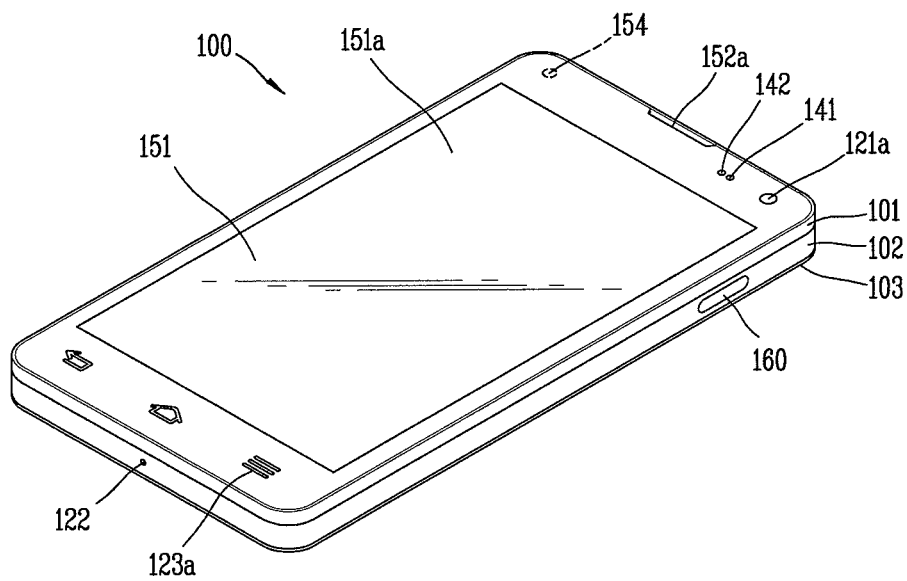
FIGS. 1B and 1C are conceptual views of one example of the mobile terminal, viewed from different directions.
Figure 1C:
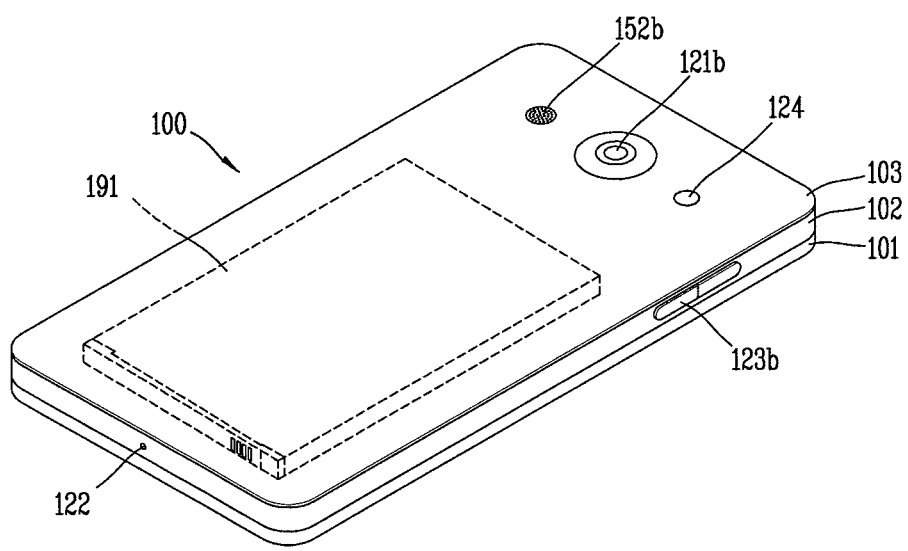

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

Referring now to FIG. 1A, the mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and greater or fewer components may alternatively be implemented.

The mobile terminal 100 is shown having the wireless communication unit 110 configured with several commonly implemented components. For instance, the wireless communication unit 110 generally includes one or more components which permit wireless communication between the mobile terminal 100 and a wireless communication system or network within which the mobile terminal is located.

As shown in FIG. 1A, the wireless communication unit 110 includes one or more of a broadcast receiving module 111, a mobile communication module 112, a wireless Internet module 113, a short-range communication module 114, and a location information module 115. Further, the input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is generally implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some instances, the mobile terminal 100 may perform assorted control functions associated with a connected external device, in response to the external device being connected to the interface unit 160.

The memory 170 is generally implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

In order to drive an application program stored in the memory 170, the controller 180 can control at least some of the components described above with reference to FIG. 1A. In addition, in order to drive the application program, the controller 180 can combine two or more of the components included in the mobile terminal 100 to operate the same.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body. At least some of the components may be cooperatively operated to implement operations, control, or control methods of the mobile terminal according to various embodiments described hereinafter. Also, the operations, control, or control methods of the mobile terminal can be implemented in the mobile terminal by driving at least one application program stored in the memory 170.

Referring still to FIG. 1A, various components depicted in this figure will now be described in more detail. Regarding the wireless communication unit 110, the broadcast receiving module 111 is configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen.

Further, the virtual key or the visual key may be displayed on the touch screen in various shapes, for example, graphic, text, icon, video, or a combination thereof. The user input unit 123 may recognize information sensed by the sensing unit 140, as well as by the aforementioned mechanical input mechanism and touch type input mechanism, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller 180 can process the received signals, and then transmit corresponding data to the controller 180. Accordingly, the controller 180 can sense which region of the display unit 151 has been touched. Here, the touch controller 180 can be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output units 152a and 152b, the proximity sensor 141, an illumination sensor 142, a light output unit 154, first and second cameras 121a and 121b, first and second manipulation units 123a and 123b, a microphone 122, an interface unit 160, and the like.

Hereinafter, as illustrated in FIGS. 1B and 1C, the mobile terminal 100 in which the display unit 151, the first audio output unit 152a, the proximity sensor 141, the illumination sensor 142, the optical output module 154, the first camera 121a, and the first manipulation unit 123a are disposed on a front surface of the terminal body, the second manipulation unit 123b, the microphone 122, and the interface unit 160 are disposed on the side of the terminal body, and the second audio output unit 152b and the second camera 121b are disposed on a rear surface of the terminal body will be described as an example.

However, the components are not limited to the configuration. The components may be excluded, replaced, or disposed on other surfaces as needed. For example, the first manipulation unit 123a may not be provided on the front surface of the terminal body, and the second audio output unit 152b may be provided on the side of the terminal body, rather than on the rear surface of the terminal body.

The display unit 151 may display (or output) information processed in the mobile terminal 100. For example, the display unit 151 may display executed screen information of an application program driven in the mobile terminal 100, or user interface (UI) information or graphic user interface (GUI) information according to the executed screen information.

The display unit 151 may include a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver and the second audio output unit 152*b* may be implemented in the form of a loud speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof. Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. However, the present invention is not limited thereto and a position of the rear input unit may be modified.

When the rear input unit is provided on the rear surface of the terminal body, a new user interface may be implemented. Also, when the touch screen or the rear input unit as described above replaces at least some functions of the first manipulation unit 123*a* provided on the front surface of the terminal body so the first manipulation unit 123*a* is omitted from the front surface of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. Further, the second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal that may include one or more of the components as described above according to an embodiment of the present invention can display an image received through a camera on a display unit. In more detail, the mobile terminal can display an image being received through a camera on a display unit in real time. Here, an image received through the camera may be expressed as a "preview image", "image", or the like.

The mobile terminal according to an embodiment of the present invention can provide an image capturing function of storing an image (preview image) received through a camera in a memory. Here, the operation of storing, by the mobile terminal, an image received through the camera in the memory may be expressed as "capturing an image", "obtaining an image", "capturing a preview image", "performing capturing on a preview image", "processing imaging command on a preview image", "performing an image capturing function on a preview image", or the like. Also, without being restricted to the above-mentioned expressions, any expression may be freely used as long as it means that an image received through a camera is stored in a memory unit.

In an embodiment, a mobile terminal can perform an image capturing operation based on user selection. Such a user selection may be expressed as a "user control command" or "control command." User selection may be performed in various manners. For example, a user may select an image capturing function by touching or pressing a hardware key provided in the mobile terminal or by touching at least one of a software key and a visual key output to the display unit 151.

Namely, when a hardware key associated with an image capturing function is touched or pressed or when at least one of a software key and a visual key output to the display unit 151 is touched, the controller 180 can determine that a user control command for performing an image capturing function has been received. Based on such a control command, the controller 180 can capture an image input through the camera 121. Also, in addition to these examples, the image capturing function may be performed when a user voice corresponding to a pre-set command is received, when a particular gestures is applied to the mobile terminal, of when a pre-set movement is sensed by the mobile terminal.

Meanwhile, in an embodiment of the present invention, the image capturing function may be executed. Execution of the image capturing function may refer to execution of an application driven to capture an image. When the image capturing function is executed, the controller 180 can activate the camera 121 in preparation for capturing an image. Also, the controller 180 can output an image input through the camera 121 to the display unit 151.

In addition, in an embodiment of the present invention, an image input through the activated camera 121 and output to the display unit 151 is defined as a "preview image." As the preview image, an image input through the camera 121 in real time may be displayed on the display unit 151. Also, when an image capturing operation is performed based on a user selection, the controller 180 can store a preview image being output to the display unit 151 in the memory 170.

Figure 2:
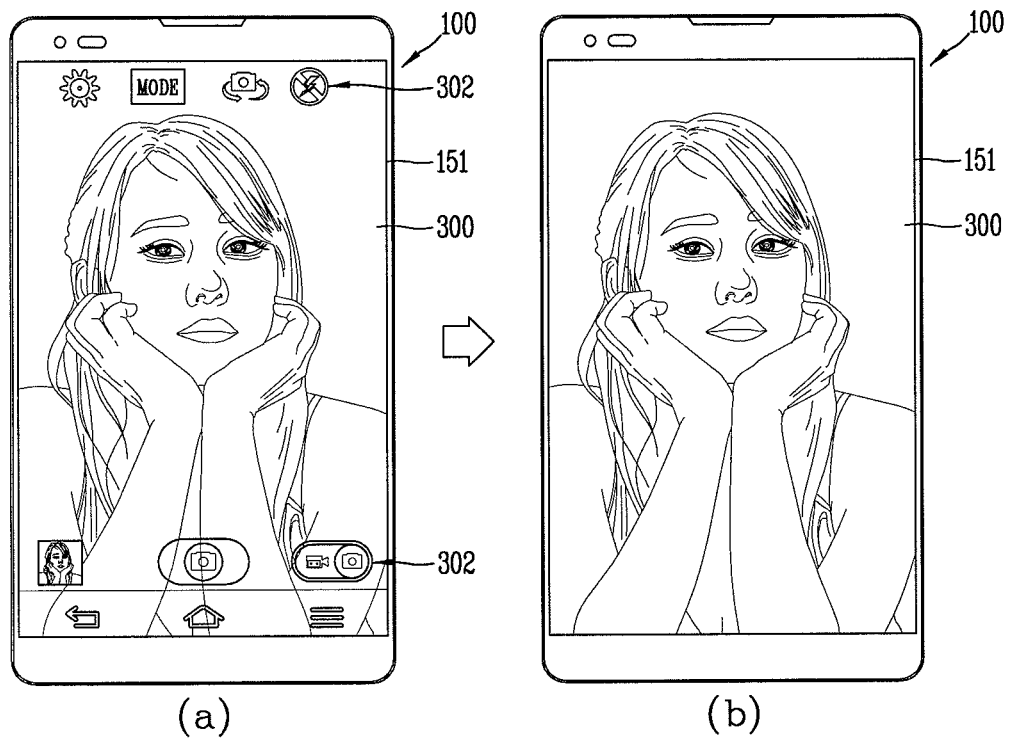
FIG. 2 is a conceptual view of a mobile terminal according to an embodiment of the present invention.

Hereinafter, an operation of the mobile terminal in executing the image capturing function will be described with reference to FIG. 2. In particular, FIG. 2 is a conceptual view of a mobile terminal according to an embodiment of the present invention. As discussed above, the mobile terminal according to an embodiment of the present invention may execute an image capturing function.

For example, the image capturing function may be executed when an icon associated with the image capturing function (or an icon of an application) is selected (or touched). When the image capturing function is executed through the icon, the display unit 151 may be in an ON state. In addition to the scheme of selecting the icon associated with the image capturing function to execute the image capturing function, the image capturing function may also be executed when at least one of keys provided in the mobile terminal (for example, at least one of a hardware key and a software key) is selected. In this instance, even though the display unit 151 is in an OFF state, the controller 180 can execute the image capturing function in response to selection of a key provided in the mobile terminal.

When the image capturing function is executed as mentioned above, the controller 180 can display a preview image 300 and a graphic object 302 related to the image capturing function on the display unit 151 as illustrated in (a) of FIG. 2. Namely, the controller 180 can output the graphic object 302 related to the image capturing function to the display unit 151 in an overlapping manner. Here, the graphic object 302 may be at least one among the software key and the visual key as described above.

Also, based on a user request, the controller 180 can control the camera to perform capturing on the preview image 300. In more detail, based on a user request applied to the graphic object 302 output to the display unit 151, the controller 180 can set functions (for example, setting, an image capturing mode, switching between a front camera and a rear camera, flash, switching between still image and video, entry to memory, and the like) related to the image capturing function, and may perform capturing on the preview image 300 based on a touch applied to an image capturing button.

In an embodiment of the present invention, a state in which the graphic object 302 related to the image capturing function overlaps with the preview image 300 as illustrated in (a) of FIG. 2 is defined as a "first state." In the mobile terminal according to an embodiment of the present invention, when the image capturing function is executed, the graphic object 302 may not be output and only the preview image 300 may be output to the display unit 151 as illustrated in (b) of FIG. 2.

Further, the state in which only the preview image 300 is output to the display unit 151, without the graphic object 302 thereon, as illustrated in (b) of FIG. 2 may be expressed as a state in which outputting of the graphic object 302 to the preview image 300 is limited. Also, in an embodiment of the present invention, the state in which outputting of the graphic object 302 to the preview image 300 is limited is defined as a "second state." In the second state, the controller 180 can perform capturing on the preview image 300 based on a user request. For example, when a touch applied to a region of the display unit 151 output to the preview image 300 is sensed, the controller 180 can process the sensed touch as an image capturing command.

Also, the controller 180 can store the captured preview image 300 in the memory 151. In other words, the controller 180 can execute the image capturing function in any of the first state in which the graphic object 302 and the preview image 300 are output together and the second state in which outputting of the graphic object 302 to the preview image 300 is limited.

Also, the controller 180 can determine in which of the first state and the second state the display unit is to operate, based on a user request. In more detail, based on a user request, the controller 180 can control the display unit 151 to operate in any one of the first state in which the graphic object 302 related to the image capturing function overlaps with the preview image 300 and the second state in which outputting of the graphic object 302 to the preview image 300 is limited.

The display unit 151 may operate in any one of the first state in which the graphic object 302 related to the image capturing function overlaps with the preview image 300 and the second state in which outputting of the graphic object 302 to the preview image 300 is limited according to a user request. For example, based on a user request, the controller 180 can output a menu for selecting any one of the first state and the second state, and when the user selects anyone of the first state and the second state from the menu, the controller 180 can control the display unit 151 to operate in the selected state. In another example, when a pre-set type touch (for example, a flicking touch) applied by the user to the display unit 151 is sensed, the controller 180 can switch a state of the display unit 151 from the first state to the second state or from the second state to the first state.

When the display unit 151 is in the first state, the controller 180 can capture the preview image 300 based on a user selection (or touch) with respect to the graphic object 302 (image capturing button) output to the display unit 151. A method of executing an image capturing function on the preview image 300 when the display unit 151 is in the second state will now be described in detail.

Figure 3:
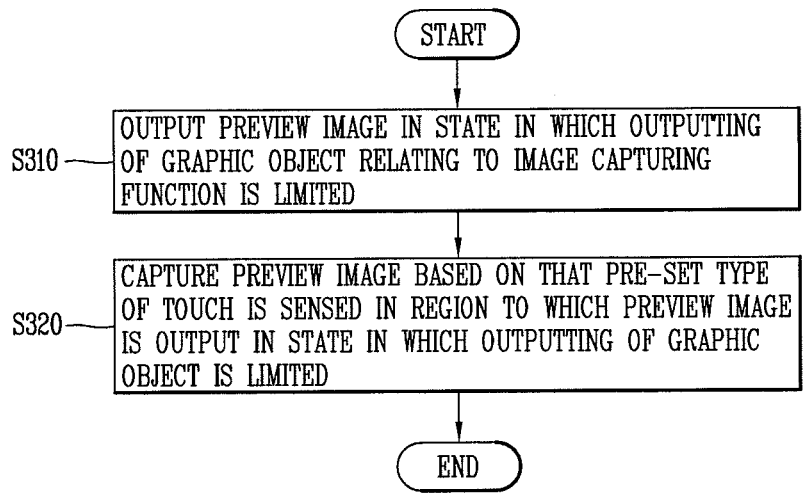
FIG. 3 is a flow chart illustrating a method of controlling a mobile terminal according to an embodiment of the present invention.

Hereinafter, the method of performing image capturing when the display unit 151 is in the second state will be described in detail with reference to FIGS. 3 and 4. FIG. 3 is a flow chart illustrating a method of controlling a mobile terminal according to an embodiment of the present invention, and FIG. 4 is a conceptual view illustrating the control method of FIG. 3. The controller 180 can execute the image capturing function, and the image capturing function may be executed in various manners based on selection of (or touch applied to) an icon associated with the image capturing function (or an icon of an application).

When the image capturing function is executed, the controller 180 can activate the camera 121. The controller 180 can output the preview image 300 input through the camera 121 to the display unit 151. The display unit 151 may include a display region (or an execution screen display region) on which an execution screen of an application is displayed. Only the preview image 300 may be output to the display region.

Namely, a graphic object related to image capturing may not be displayed on the display unit 151. In other words, the controller 180 can limit outputting of a graphic object relating to the image capturing function. Since outputting of a graphic object is limited, only a preview image can be output to the display unit 151 as shown in step S310. Thus, a phenomenon in which a portion of the preview image is covered by a graphic object when the graphic object is output does not occur.

Namely, the controller 180 can limit outputting of a graphic image relating to the image capturing function and output the preview image 300 (e.g., as a full screen). In more detail, the controller 180 can not output a graphic object that covers a portion of the preview image. The graphic object may include an image capturing button, a setting button for changing a setting with respect to the preview image 300, a button for entering a gallery to check an image stored in the memory, a button for switching between a still image capturing mode and a video capturing mode, and the like.

When only the preview image 300 is output, without overlapping with the graphic object 320, the controller 180 can execute the image capturing function. In this instance, since outputting of a graphic object including an image capturing button, or the like, is limited, the controller 180 can process a user request as an image capturing command with respect to the preview image 300.

Namely, in the second state in which outputting of a graphic object to the display unit 151 is limited, the controller 180 can perform capturing on the preview image 300 based on a user request. Here, the user request may be a user touch applied to the display unit 151. As a pre-set type touch is sensed, the controller 180 can perform capturing on the preview image 300.

In other words, in the second state in which outputting of the graphic object 302 to the display unit 151 is limited, when a pre-set type touch is sensed in a region in which the preview image 300 is output, the controller 180 can process the sensed touch as an image capturing command in step S320. Thereafter, the controller 180 can perform image capturing based on the sensed pre-set type touch and store the captured image in the memory 170.

Hereinafter, a method of controlling the image capturing function based on various touches applied to a region on which a preview image is output in the second state will be described. For example, the controller 180 can control types of images captured based on different types of touches. The types of images may include a still image, video, and the like. A method of controlling the mobile terminal 100 will now be described in detail with reference to FIG. 5.

When a pre-set type of touch is applied to a portion of the region of the display unit 151 to which the preview image 300 is output, the controller 180 can capture an image. In this instance, the controller 180 can perform image capturing regardless of position to which the pre-set type of touch is applied. When the pre-set type of touch is applied, the controller 180 can adjust a focus with respect to the preview image 300.

The focus adjusting function may be performed based on pre-set different types of touches being applied. Different types of focus adjusting functions may be associated with the pre-set different types of touches. Namely, when any one of the pre-set different types of touches is sensed, the controller 180 can adjust a focus with respect to the preview image 300 according to the scheme associated to the sensed touch. Also, the controller 180 can adjust a focus in consideration of a position to which the pre-set type of touch is applied.

For example, when a pre-set type of touch applied to a first region of the preview region 300 is sensed, the controller 180 can adjust a focus, and when a pre-set type of touch applied to a second region, different from the first region, of the preview region is sensed, the controller 810 may perform the image capturing function without adjusting focus. The control method relating to adjustment of focus by the controller 180 will be described in detail with reference to FIG. 6. Thus, when capturing of the preview image is performed based on the sensed pre-set type of touch, the captured image may be stored in the memory 170.

This may be understood with reference to FIG. 4. As illustrated in (a) of FIG. 4, the controller 180 can output the preview image 300 to the display unit 151 in the second state in which outputting of a graphic relating to image capturing is limited. Subsequently, as illustrated in (b) of FIG. 4, when a pre-set type of touch applied to the region on which the preview image 300 is output is sensed, the controller 180 can capture the image as illustrated in (c) of FIG. 4. The captured image may be stored in the memory 170.

As described above, in the mobile terminal according to an embodiment of the present invention, outputting of a graphic object to the preview image is limited and only the preview image is provided, whereby the preview image is not covered by a graphic object when image capturing. Also, in the mobile terminal according to an embodiment of the present invention, even in a state in which outputting of a graphic object is limited, the preview image may be captured through a simple manipulation. Thus, the user can view a clean image and capture the same, and thus, the user convenience is increased.

Hereinafter, a method of controlling the image capturing function based on various touches will be described in detail with reference to the accompanying drawings. In particular, FIGS. 5A to 5D are conceptual vies illustrating a method of controlling an image capturing function variously based on various touches. The controller 180 can perform various image capturing functions and perform image capturing function in different image capturing modes.

Here, the image capturing modes may include a still image capturing mode, a video capturing mode, a shot & clear mode (mode in which a particular portion (subject) include in a captured image is removed), a high dynamic range (HDR) mode, a panorama mode, a virtual reality (VR) panorama mode, a burst shot mode, a beauty shot mode (mode in which pixels discovered to have different colors discriminated from neighboring colors are changed to average value of the neighboring colors), a dual-camera mode (simultaneously capturing image using both a front camera and a rear camera), a time machine camera mode (mode in which images are captured and stored at pre-set time intervals in a memory and a pre-set number of stored images are displayed based on a point in time at which image capturing was performed), an intelligent photo mode (mode in which a most appropriate image capturing mode is set for each situation and image capturing is performed accordingly), a sports mode (mode in which a shutter speed is set to be faster to capture the moments), a night mode (mode in which an aperture is widened to increase an amount of input light), and the like.

The controller 180 can capture the preview image 300 in different image capturing modes based on pre-set different types of touches. Here, the pre-set different types of touches may include a short touch (or tap), a long touch, a drag touch, a flick touch, a swipe touch, and a hovering touch. Different functions relating to the image capturing may be associated with the pre-set different types of touches in the memory 170. Namely, when any one of the pre-set different types of touches is sensed, the controller 180 can perform a function associated with the sensed touch with reference to information (matching information) in association and stored in the memory 170.

For example, as illustrated in (a) of FIG. 5A, when a first type of touch to which a control command to capture an image in the still image mode among the pre-set types is sensed in the region on which the preview image 300 is output, the controller 180 can capture a still image. For example, when the first type of touch (for example, a short touch or click) applied to the region on which the preview image 300 is output is sensed, a still image as illustrated in (b) of FIG. 5A may be captured.

Figure 5B:
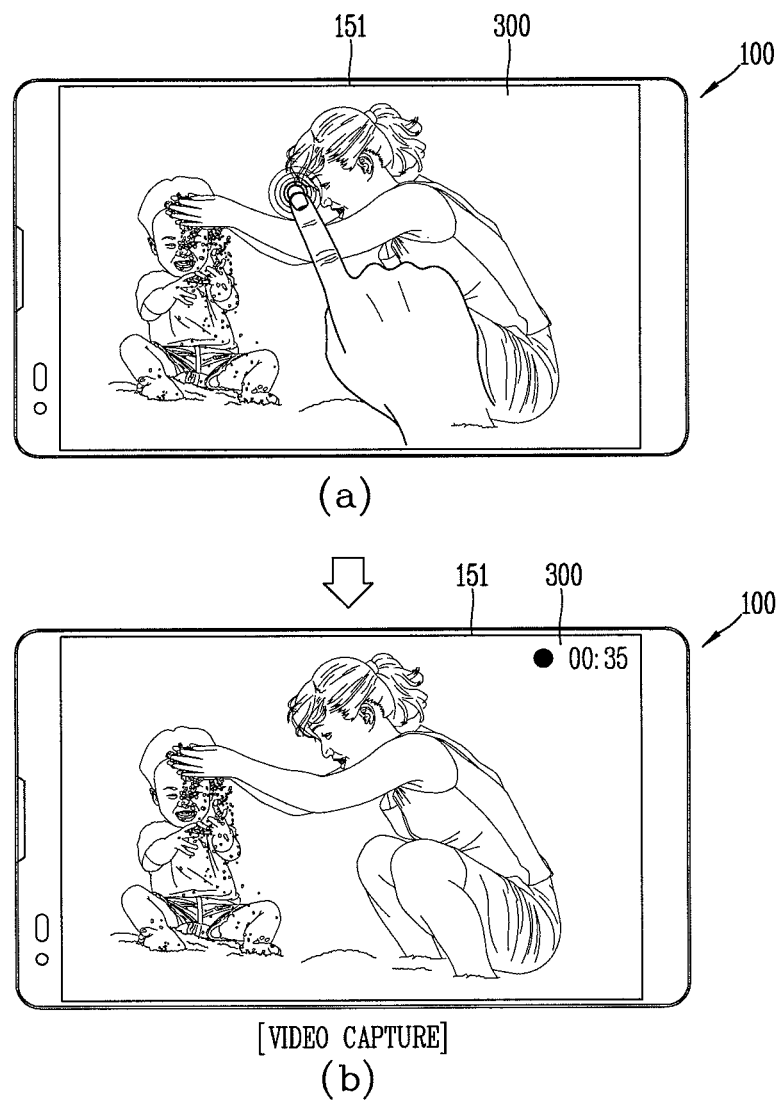

In another example, as illustrated in (a) of FIG. 5B, when a second type of touch, which is matched to a control command to capture an image in a video capturing mode different from the first type of touch among the pre-set types of touches, applied to the region on which the preview image 300 is output, a video can be captured. For example, when a second type of touch (for example, a long touch) applied to the region on which the preview image 300 is output is sensed, a video may be captured as illustrated in (b) of FIG. 5B. Thereafter, in a state in which video is being captured based on the second type of touch, when the second type of touch is sensed again or a different type of touch (for example, a short touch) from the second type is sensed, the controller 180 can stop capturing the video.

Figure 5C:
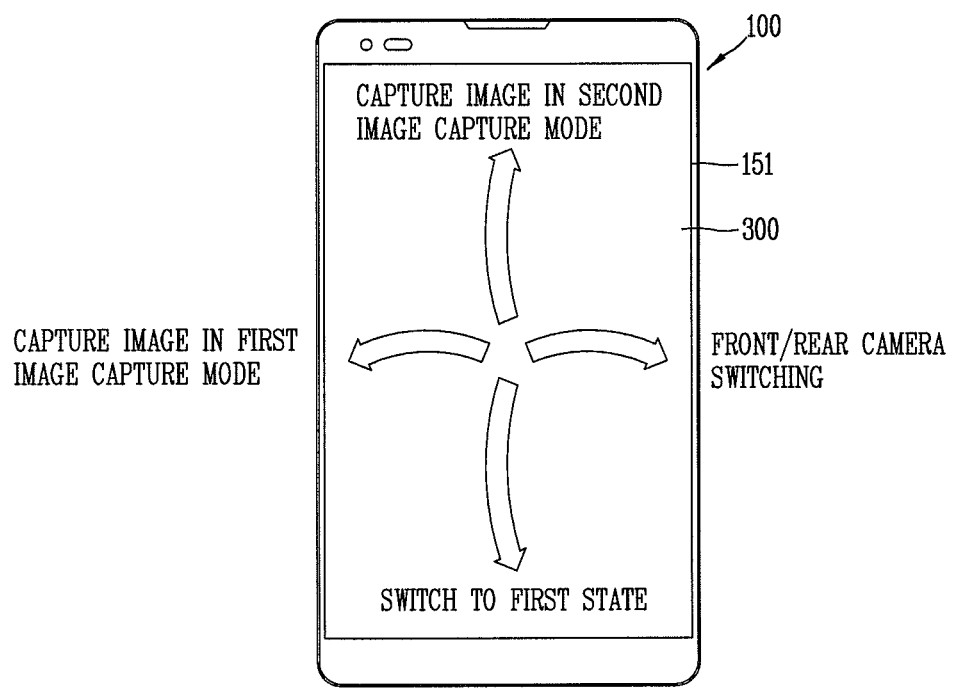

In another example, as illustrated in FIG. 5C, the image capturing function may be executed on the preview image 300 in the image capturing mode associated with a pre-set type touch among different image capturing modes. In more detail, the pre-set type of touch may be one of a plurality of touches applied in different movement directions. The plurality of touches applied in different movement directions may include a drag touch, a flick touch, and the like. The plurality of touches may be associated with control commands for capturing an image in different image capturing modes, respectively. As illustrated in FIG. 5C, the controller 180 can perform an image capturing function on the preview image 300 in an image capturing mode associated with the sensed touch (one of a plurality of touches applied in different movement directions) among the different image capturing modes.

For example, the pre-set type of touch may be any one of a drag touch applied in a first direction and a drag touch applied in a second direction different from the first direction. Also, the drag touch applied in the first direction may be associated with a first image capturing module, and the drag touch applied in the second direction may be associated with a second image capturing mode different from the first image capturing mode. In this instance, the controller 180 can execute an image capturing function in the image capturing mode associated with a direction of the drag touch applied in the first and second image capturing modes.

As illustrated in FIG. 5C, when the first image capturing mode is associated with a touch applied in the leftward direction, and when a touch applied to the region in which the preview image 300 is output in the leftward direction, the controller 180 can perform the image capturing function in the first image capturing mode based on the sensed touch. Also, as illustrated in FIG. 5C, when any one touch (for example, a touch applied in a downward direction) among a plurality of touches applied in different movement directions is sensed in the second state, the controller 180 can switch a state of the display unit 151 from the second state to the first state in which a graphic object related to the image capturing function is output.

Also, a front/rear camera switching function may be associated with the pre-set type of touch. For example, as illustrated in FIG. 5C, a drag touch applied in a third direction may be associated with the front/rear camera switching function. When a touch applied in the third direction is sensed, the controller 180 can switch an activated camera from the front camera to the rear camera or from the rear camera to the front camera. Accordingly, in an embodiment of the present invention, without additionally outputting a graphic object relating to the image capturing function to switch the front/rear camera, the front/rear camera may be switch in the second state in which outputting of the graphic object is limited.

In another example, as illustrated in FIG. 5D, the controller 180 can execute the image capturing function based on that an object approaches the display unit 151. The controller 180 can sense an object that approaches a predetermined detection surface through the proximity sensor 141. When the object is sensed, the controller 180 can capture the preview image 300. The object may include the user's fingers, face, and the like.

For the convenience of explanation, the term "proximity touch" will be referred to herein to denote the scenario in which an object is positioned to be proximate to the display unit 151 without contacting the touch screen. The term "contact touch" will be referred to herein to denote the scenario in which an object makes physical contact with the display unit 151. When the proximity touch is sensed, the controller 180 can capture the preview image 300 based on the sensed proximity touch.

In more detail, when a proximity touch is sensed for more than a pre-set period of time, the controller 180 can capture the preview image 300. Thus, in an embodiment of the present invention, the proximity touch and the contact touch may be clearly differentiated. In more detail, the contact touch is positioned above the display unit 151 at one moment while it comes into contact with the display unit 151, and thus, it includes a proximity touch. In an embodiment of the present invention, when a proximity touch is sensed for more than a pre-set period of time, the preview image is captured, and thus, a problem in which the mobile terminal recognizes the contact touch as a proximity touch when the user desires to make a contact touch can be solved.

The controller 180 can output the preview image 300 in a state in which outputting of the graphic object is limited. Subsequently, as illustrated in (a) of FIG. 5D, the controller 180 can sense a proximity touch that an object is positioned to be proximate to the display unit 151, without being in contact with the display unit 151. When the proximity touch is sensed, as illustrated in (b) of FIG. 5D, the controller 180 can capture the preview image 300. In an embodiment of the present invention, by executing the image capturing function using proximity touch, a foreign object remaining due to a touch may be prevented in advance, and thus, image capturing may be performed, while viewing the clean preview image.

As described above, in the mobile terminal according to an embodiment of the present invention, in a state in which outputting of a graphic object is limited, various functions relating to the image capturing function may be executed as different pre-set types of touches are sensed. Thus, even without a graphic object covering a portion of the preview image, the user may execute his or her desired image function, and thus, user convenience can be increased.

Meanwhile, in the mobile terminal according to an embodiment of the present invention, when a pre-set type of touch is sensed in a state in which outputting of a graphic object is limited, a focus with respect to the preview image may be adjusted based on the sensed touch. In particular, FIGS. 6A to 6G are conceptual views illustrating a method of adjusting focus with respect to a preview image utilizing touches applied to a display unit.

When only the preview image is output to the display unit 151 (the second state), the controller 180 can adjust a focus with respect to the preview image. In an embodiment, a focus function includes a continuous auto focus (CAF) function of automatically adjusting focus when the mobile terminal is stopped for a predetermined period of time, a touch auto focus (TAF) of adjusting focus based on a region where a touch is sensed when the touch applied to the preview image is sensed, and the like. Hereinafter, a method for setting a region in which focus is adjusted in a preview image by the controller 180 will be described with reference to the accompanying drawings.

As described above with reference to FIGS. 3 and 4, the controller 180 can execute the image capturing function by a touch when outputting of a graphic object relating to the image capturing function is limited. In addition, when a pre-set type of touch is sensed in the region on which the preview image 300 is output in the state in which outputting of a graphic object relating to the image capturing function is limited, the controller 180 can adjust a focus with respect to the preview image before executing the image capturing function.

In an embodiment, when a pre-set type of touch is sensed in the region on which the preview image 300 is output, the controller 180 can adjust a focus about the region where the touch has been sensed in the region on which the preview image 300 is output. For example, when a pre-set type of touch (for example, a short touch) is sensed in a region on which the preview image 300 is output as illustrated in (a) of FIG. 6A, the controller 180 can adjust a focus about the region in which the touch (short touch) has been sensed in the region on which the preview image 300 is output as illustrated in (b) of FIG. 6A.

Figure 6A:
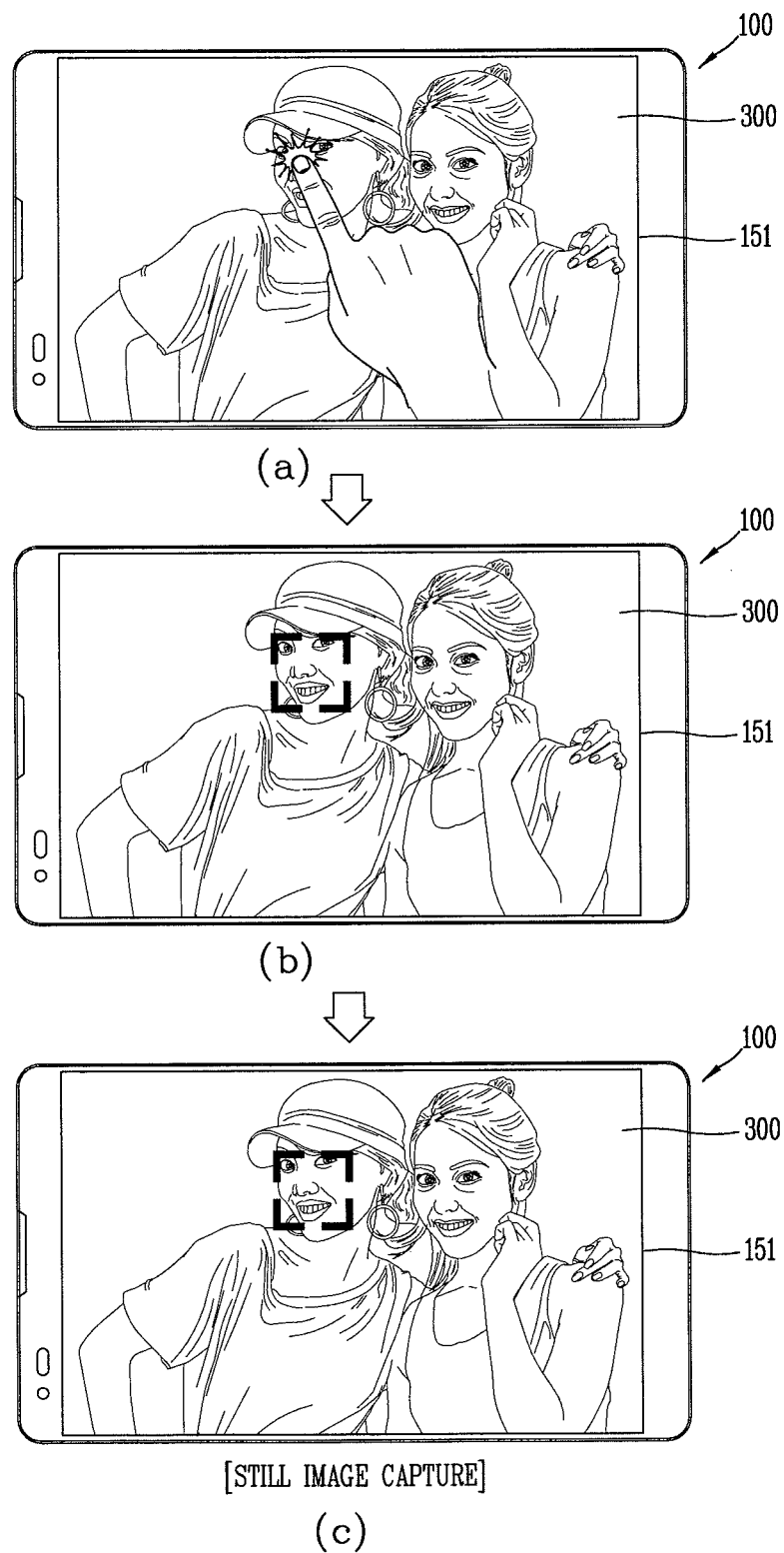

Thereafter, as illustrated in (c) of FIG. 6A, the controller 180 can capture a still image with respect to the preview image 300 whose focus has been adjusted about the region in which the touch has been sensed. Namely, as illustrated in (a), (b), and (c) of FIG. 6A, when a single short touch has been applied the controller 180 can adjust a focus around the region to which the single short touch has been applied, and sequentially capture the still image.

Also, when a pre-set type of touch (for example, a short touch) is sensed in the region on which the preview image 300 is output, the controller 180 can adjust a focus around the region in which the touch has been sensed, as illustrated in (b) of FIG. 6A. Thereafter, when a pre-set type of touch (for example, a short touch) is applied again in a state in which focus has been adjusted about the region in which the touch was sensed, the controller 180 can capture a still image with respect to the focus-adjusted preview image 300.

Figure 6B:
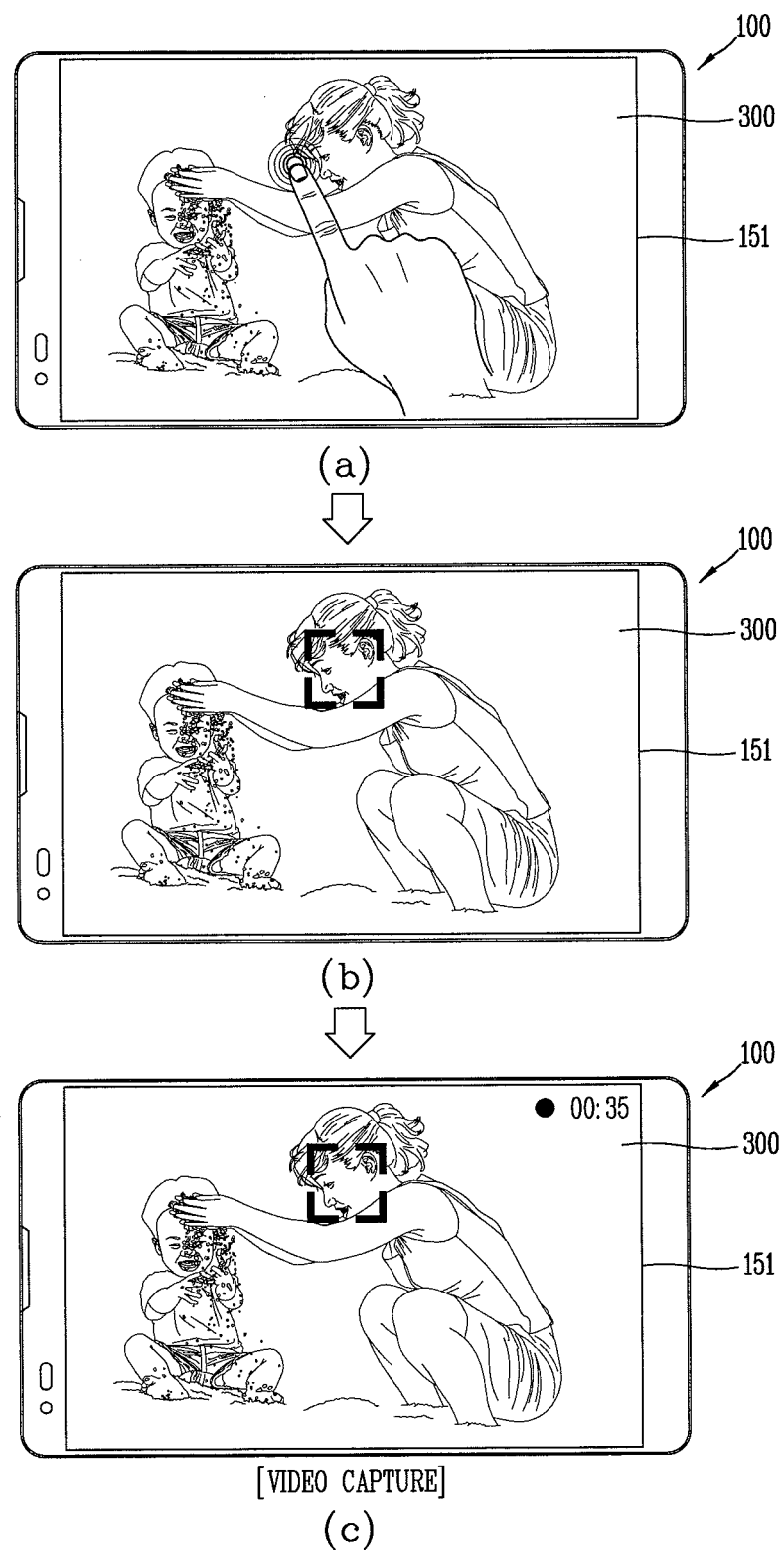

In another embodiment, when a pre-set type of touch (for example, a long touch) is sensed in the region on which the preview image 300 is output in the second state as illustrated in (a) of FIG. 6B, the controller 180 can adjust a focus about the region in which the touch (long touch) has been sensed in the region on which the preview image 300 is output, as illustrated in (b) of FIG. 6B. Thereafter, as illustrated in (c) of FIG. 6B, the controller 180 can capture video with respect to the focus-adjusted preview image 300. As illustrated in FIG. 6B, the controller 180 can perform both focus adjustment and video capturing only with the single touch (long touch), or alternatively, when a single touch (long touch) is applied, the controller 180 can only adjust a focus, and thereafter, when additional touch is applied, the controller 180 can capture video.

Here, the additional touch may be a touch (long touch) already applied to the region on which the preview image 300 is output or may be a touch (for example, short touch) different from the already applied touch to execute a function corresponding to the already applied touch (long touch). Namely, based on the initially input touch type, the controller 180 can adjust a focus about the region to which the touch has been applied, as well as determining an image capturing function with respect to the preview image 300. Also, since the image capturing function is determined based on the initially input touch, when a touch (for example, a short touch) different from the initially input touch is sensed, the controller 180 can process the focus-adjusted preview image 300 according to the determined image capturing function.

The controller 180 can perform focus adjustment and image capturing only with a single touch. In more detail, the pre-set type of touch may include a touch-down applied to the display unit 151 and a touch-up to release a touch applied to the display unit 151. For example, a short touch may include a short touch-down and a short touch-up, and a long touch may include a long touch-down and a long touch-up.

When a touch is a short touch-down or a short touch-up or whether a touch is a long touch-down or a long touch-up may be determined based on a period of time during which a touch is maintained between a touch-down and a touch-up. For example, when a period of time during which a touch is maintained between a touch-down and a touch-up included in the touch is shorter than a pre-set period of time, the controller 180 can determine the touch as a short touch. Also, when a period of time during which a touch is maintained between a touch-down and a touch-up included in the touch is longer than a pre-set period of time, the controller 180 can determine the touch as a long touch.

When a touch-down is sensed in the display unit 151, the controller 180 can process the sensed touch-down as a control command for adjusting focus about a region in which the touch-down has been sensed. When the touch-up is sensed, the controller 180 can process the sensed touch-up as a control command for capturing an image. Thus, referring to FIGS. 6A and 6B, the controller 180 can perform focus adjustment and image capturing only with a single touch.

Figure 6C:
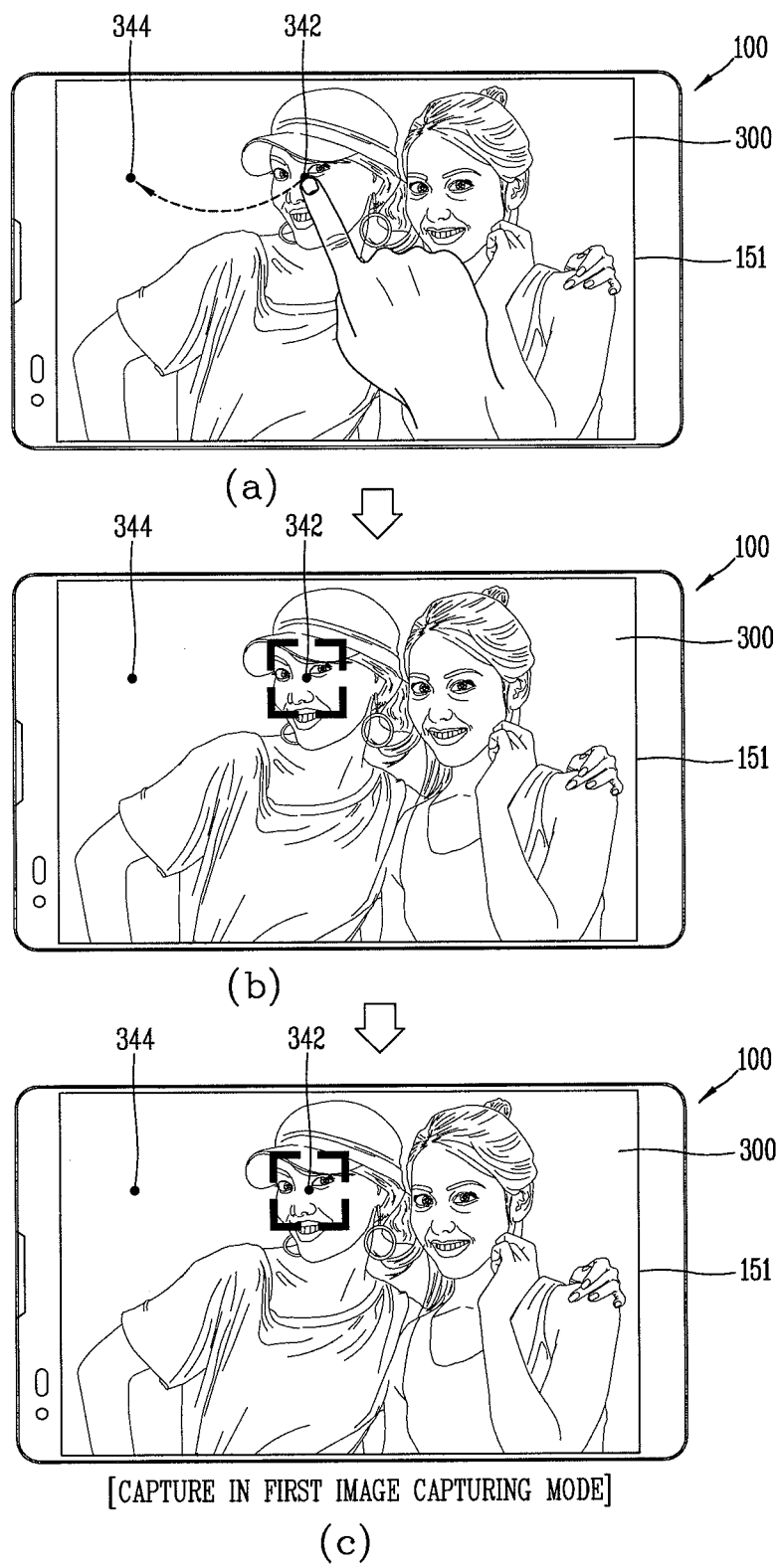

In another embodiment, as illustrated in (a) of FIG. 6C, the controller 180 can adjust a focus with respect to a preview image based on a drag touch applied in a pre-set direction. The controller 180 can adjust a focus based on at least one point included in a path along which the drag touch is sensed. For example, when a drag touch applied in a pre-set direction is sensed, the controller 180 can adjust a focus based on at least one of a start point 342 and an end point 344 in the region on which the preview image 300 is output.

For example, as illustrated in (a) of FIG. 6c, when a drag touch applied in a pre-set movement direction including the start point 342 and the end point is sensed, as illustrated in (b) of FIG. 6C, the controller 180 can adjust a focus based on the start point 342. Thereafter, as illustrated in (c) of FIG. 6C, the controller 180 can execute an image capturing function on the focus-adjusted preview image 300 based on the start point 342 in an image capturing mode (for example, the first image capturing mode illustrated in FIG. 5C) associated with the drag touch applied in the pre-set movement direction.

Further, the controller 180 can adjust a focus based on the end point 344 included in the drag touch applied in the pre-set movement direction, or may adjust a focus based on both the start point 342 and the end point 344. Also, as described above with reference to FIG. 6A, the controller 180 can perform focus adjustment only with a single touch (a touch applied in a pre-set movement direction) and image capturing in the image capturing mode associated with the single touch (the touch applied in the pre-set movement direction) as well, or alternatively, when a single touch (a touch applied in a pre-set movement direction) is applied, the controller 180 can perform only the focus adjustment, and thereafter, when an additional touch is applied, the controller 180 can perform the image capturing function in the associated image capturing mode.

Figure 6D:
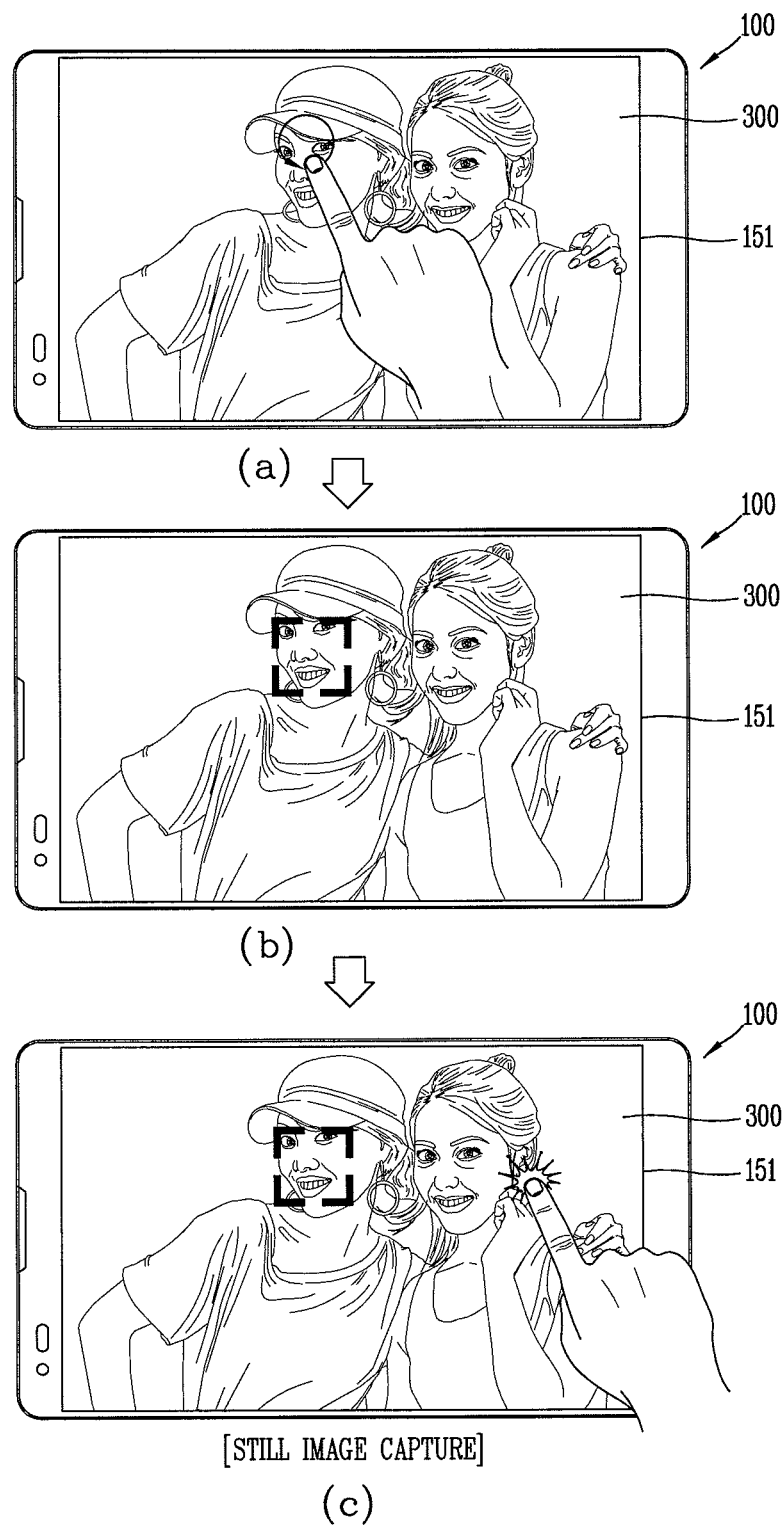

In another embodiment, as illustrated in (a) of FIG. 6D, when a pre-set type of touch (for example, a drag touch extending to draw a circular trace from a start point of a touch, which will be referred to as a 'circular drag touch', hereinafter) is applied, the controller 180 can adjust a focus based on the touch-applied region. For example, as illustrated in (a) of FIG. 6D, when a circular drag touch is sensed in the region on which the preview image 300 is output, as illustrated in (b) of FIG. 6D, the controller 180 can adjust a focus based on the region in which the drag touch has been sensed.

Thereafter, when a pre-set type of touch (for example, a short touch, a long touch, a touch applied in the pre-set direction) different from the applied touch is sensed, the controller 180 can perform the image capturing function on the focus-adjusted preview image 300. Here, when an image capturing mode is associated with the circular drag touch, the controller 180 can adjust a focus only based on the single touch (the circular drag touch) and subsequently perform capturing on the preview image in the associated image capturing mode.

Figure 6E:
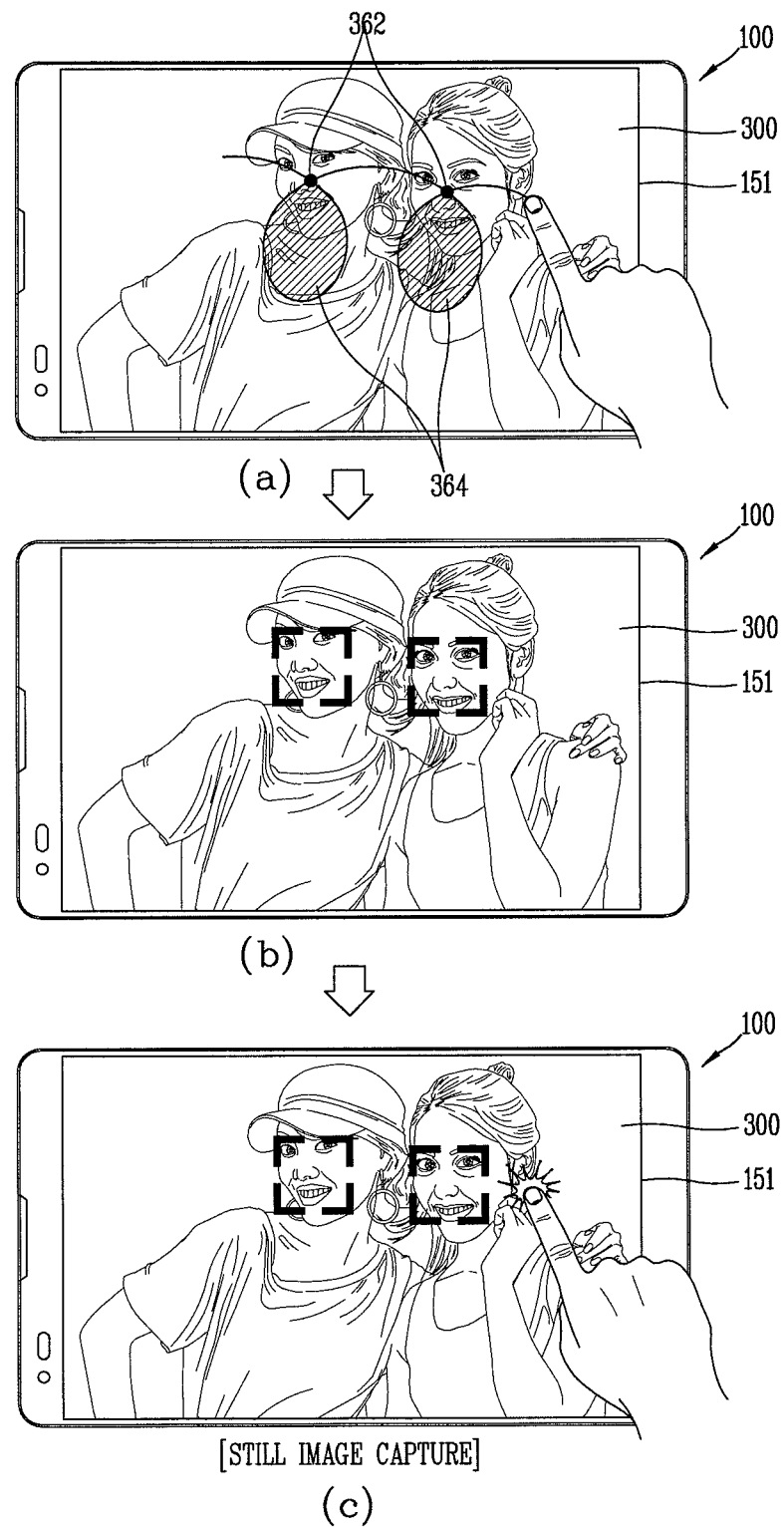

In another example, as illustrated in (a) of FIG. 6E, when a drag touch including at least one intersection point is applied, as illustrated in (b) of FIG. 6E, the controller 180 can adjust a focus based on the at least one intersection point. Thereafter, when the pre-set type of touch is sensed, the controller 180 can perform the image capturing function on the preview image 300 whose focus has been adjusted based on the at least one intersection point, on the basis of the sensed touch as illustrated in (c) of FIG. 6E. Further, the controller 180 can adjust a focus based on the at least one region 364 including the at least one intersection point.

When a pre-set type of touch (for example, a short touch, a long touch, or a touch applied in a pre-set direction) different from the applied touch is sensed, the controller 180 can perform the image capturing function on the preview image 300 whose focus has been adjusted based on the sensed touch (for example, a short touch, a long touch, or a touch applied in a pre-set direction). Similarly, as described above with reference to FIG. 6D, when an image capturing mode is associated with the drag touch including the at least one intersection point, the controller 180 can adjust a focus only based on the single touch (the drag touch including at least one intersection point) and subsequently perform capturing on the preview image in the associated image capturing mode.

In another embodiment, as illustrated in (a) of FIG. 6F, the controller 180 can divide the region of the preview image 300. Also, the controller 180 can perform different image capturing functions based on in which of the plurality of divided regions a touch is sensed. For example, the controller 180 can adjust a focus according to a touch point applied to the divided regions 332 and 334 and execute the image capturing function, or may directly execute the image capturing function without focus adjustment.

In addition, the controller 180 can display a guide line 330 indicating that the preview image has been divided on the preview image 300. for example, as illustrated in (b) of FIG. 6F, when a pre-set type of touch is applied to the first region 332, the controller 180 can adjust a focus based on the region to which the touch has been applied, and execute the image capturing function on the preview image 300. Also, as illustrated in (c) of FIG. 6F, when a pre-set type of touch is applied to the second region 334 different from the first region 332 among the divided regions, the controller 180 can immediately execute the image capturing function on the preview image 300 without focus adjustment based on the touch.

In an embodiment of the present invention, based on whether focus has been adjusted with respect to an image, an image capturing scheme to be executed when a pre-set type of touch is sensed may vary. In more detail, depending on whether focus of the preview image has been adjusted, the controller 180 can execute different functions with respect to the same type of touch.

First, when focus with respect to the preview image 300 has been adjusted according to a continuous auto focus (CAF) function automatically executed when the mobile terminal is paused for a predetermined period of time, and when a pre-set type of touch (for example, a short touch) is sensed, the controller 180 can perform capturing on the preview image 300 without performing focus adjustment. Also, a focus with respect to the preview image 300 has been adjusted according to a touch auto focus (TAF) function executed to adjust a focus based on a region in which a touch is sensed, on the basis of the touch sensed in the preview image 300, when a pre-set type of touch (for example, a short touch) is sensed, the controller 180 can perform capturing on the preview image 300 without additionally performing focus adjustment.

In another example, in a state in which focus has been adjusted on the preview image 300 by the CAF function or in a state in which focus has been adjusted on the preview image 300 by the TAF function, and when a pre-set type of touch (for example, a short touch) is sensed after the lapse of a pre-set period of time, the controller 180 can readjust a focus based on the region in which the pre-set type of touch has been sensed.

In another example, as illustrated in FIG. 6G, the controller 180 can adjust a focus with respect to the preview image 300 based on an object approaching the display unit 151. The controller 180 can sense an object that approaches a predetermined detection surface through the proximity sensor 141. When the object is sensed, the controller 180 can capture the preview image 300. The object may include the user's fingers, face, and the like.

When the proximity touch is sensed, the controller 180 can adjust a focus with respect to the preview image 300 based on the sensed proximity touch. In more detail, when the proximity touch is sensed, the controller 180 can adjust a focus with respect to the preview region corresponding to the sensed proximity touch. Also, when the proximity touch is sensed for more than a pre-set period of time, the controller 180 can adjust a focus with respect to the region of the preview image corresponding to the region in which the proximity touch is sensed. As described above, in an embodiment of the present invention, when the pre-set period of time has lapsed, focus is adjusted, whereby a proximity touch and a contact touch can be clearly differentiated.

As illustrated in (a) of FIG. 6G, in a state in which outputting of a graphic object is limited, the controller 180 can sense a proximity touch that an object is positioned to be proximate to the display unit 151 without being in contact with the display unit 151. When the proximity touch is sensed, the controller 180 can adjust a focus with respect to a region of the preview image corresponding to the sensed proximity touch. Thereafter, as illustrated in (b) of FIG. 6G, the controller 180 can capture the preview image 300 based on that a touch is applied to a region of the focus-adjusted preview image.

In another example, when the focus of the preview image has been adjusted, the controller 180 can capture the preview image 300 based on a voice signal input from the outside. As described above, in the mobile terminal according to an embodiment of the present invention, based on a pre-set type of touch being sensed in the second state in which outputting of a graphic object is limited, a focus with respect to a preview image is adjusted and an image capturing function can be executed. Thus, the user can use the image capturing function over the clean preview image not covered by a graphic object and adjust a focus with respect to the preview image through a simple manipulation, and thus, the needs of the user for capturing a high quality image are satisfied.

Hereinafter, a method for switching from a second state in which outputting of a graphic object to a display unit is limited to a first state in which a graphic object relating to an image capturing function overlaps with a preview image will be described in detail. In particular, FIGS. 7A to 7C are conceptual views illustrating an embodiment of switching from a second state in which outputting of a graphic object is limited to a first state in which a graphic object is output.

In the mobile terminal according to an embodiment of the present invention, switching may be performed between the first state and the second state. Such switching may be performed according to a user request. In more detail, based on a pre-set type of touch being sensed in a region on which the preview image 300 is output in the second state, the controller 180 can switch a state of the display unit 151 from the second state to the first state in which the graphic object 302 overlaps with the preview image 300. When any one among a plurality of touches applied in different movement directions, among pre-set types of touches, is sensed in the second state, the controller 180 can output the graphic object 302 relating to the image capturing function to the preview image 300 in an overlapping manner.

Figure 7A:
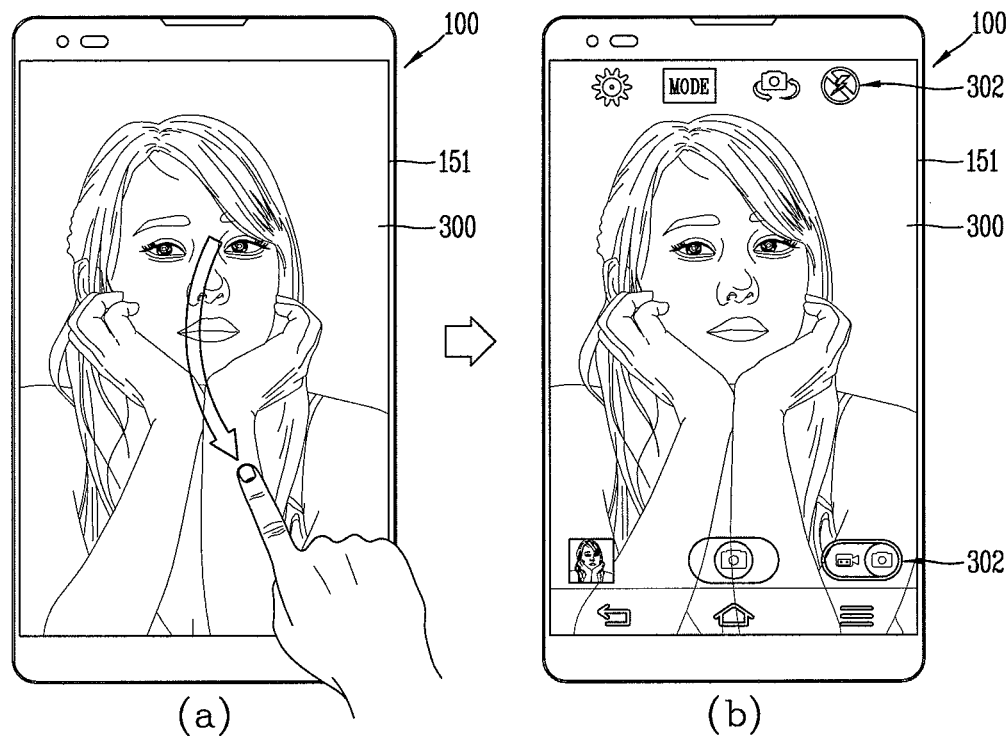
FIGS. 7A to 7C are conceptual views illustrating an embodiment of switching from a second state in which outputting of a graphic object is limited to a first state in which a graphic object is output.
Figure 7B:
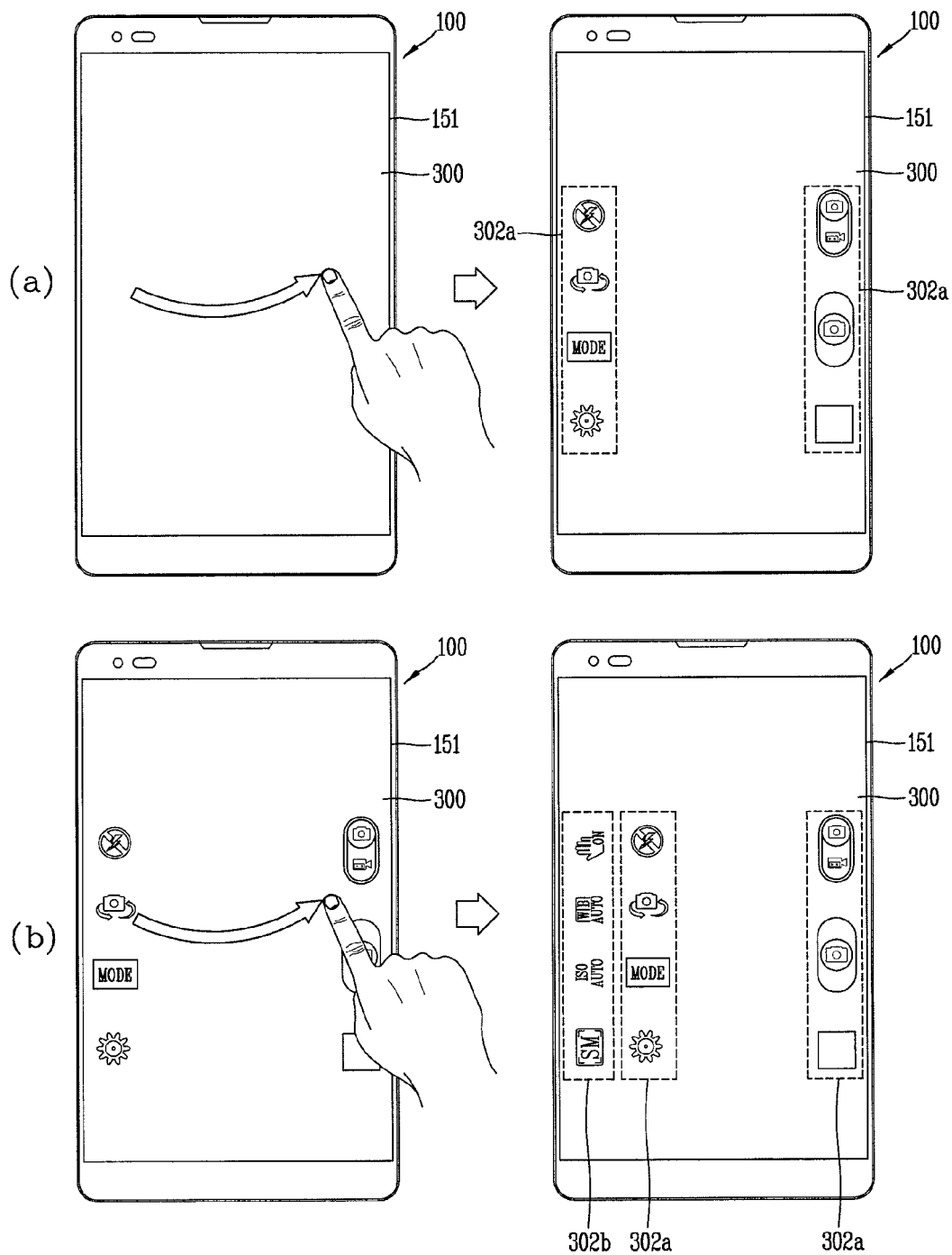
Figure 7C:
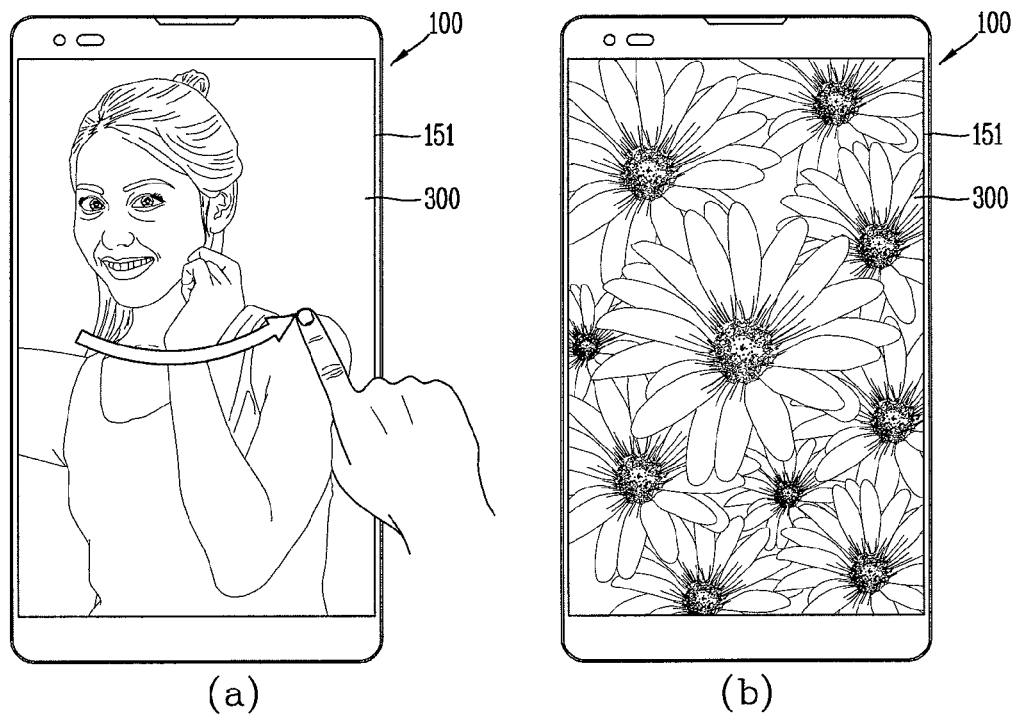

For example, as illustrated in (a) of FIG. 7A and FIG. 5C, when any one touch (for example, a drag touch applied in a downward direction) among a plurality of touches applied in different movement directions is sensed, as illustrated in (b) of FIG. 7A, the controller 180 can output the graphic object 302 relating to the image capturing function.

Also, when any one among a plurality of touches applied in different movement directions, among pre-set types of touches, to the region in which the preview image 300 is output is sensed in the second state, the controller 108 may determine a position to which a graphic object is to be output based on the movement direction of the touch. For example, as illustrated in (a) of FIG. 7B, when any one touch (for example, a drag touch applied in a rightward direction) among a plurality of touches applied in different movement directions, among pre-set types of touches, is sensed in the second state, based on the movement direction (for example, the rightward direction) of the sensed touch, the controller 180 can output graphic objects 302a at one side (left side) and the other side (right side) corresponding to the movement direction of the sensed touch.

In addition, as illustrated in (b) of FIG. 7B, when the graphic objects 302a are output, and when any one touch (for example, a touch applied in a rightward direction), among the plurality of touches, is applied again, the controller 180 can further output a graphic object 302b different from the already output graphic objects 302a. Here, preferably, the different graphic object 302b is an image capturing function belonging to a sub-category of the graphic object 302a which has been already output. However, the present invention is not limited thereto and the other graphic object 302b may be a graphic object different from the already output graphic objects 302a.

Further, when a pre-set type of touch (for example, a touch applied in a leftward direction) is applied in the first state in which a graphic object is output, the controller 180 can switch a state of the display unit 151 from the first state to a second state in which outputting of the graphic object is limited. In another example, when any one touch (for example, a drag touch applied in a rightward direction) among a plurality of touches applied in different directions, among pre-set types of touches, is sensed in the second state, the controller 180 can execute a function associated with the any one touch, instead of outputting the graphic object relating to the image capturing function.

For example, the function associated with the any one touch may be a front/rear camera switching function as illustrated in FIG. 5C. In addition, (a) of FIG. 7C is a view illustrating a state in which the front camera is activated. When a drag touch applied in a rightward direction is sensed in the second state in which outputting of a graphic object is limited as illustrated in (a) of FIG. 7C, the controller 180 can switch the activated camera from the front camera to the rear camera by executing the front/rear camera switching function associated with the drag touch applied in the rightward direction as illustrated in (b) of FIG. 7C. Also, when the rear camera is activated, and when a touch (for example, a drag touch applied in the rightward direction) associated with the front/rear camera switching function is sensed, the controller 180 can switch the activated camera from the rear camera to the front camera. Meanwhile, the mobile terminal can output a graphic object based on various types of touches.

Figure 8A:
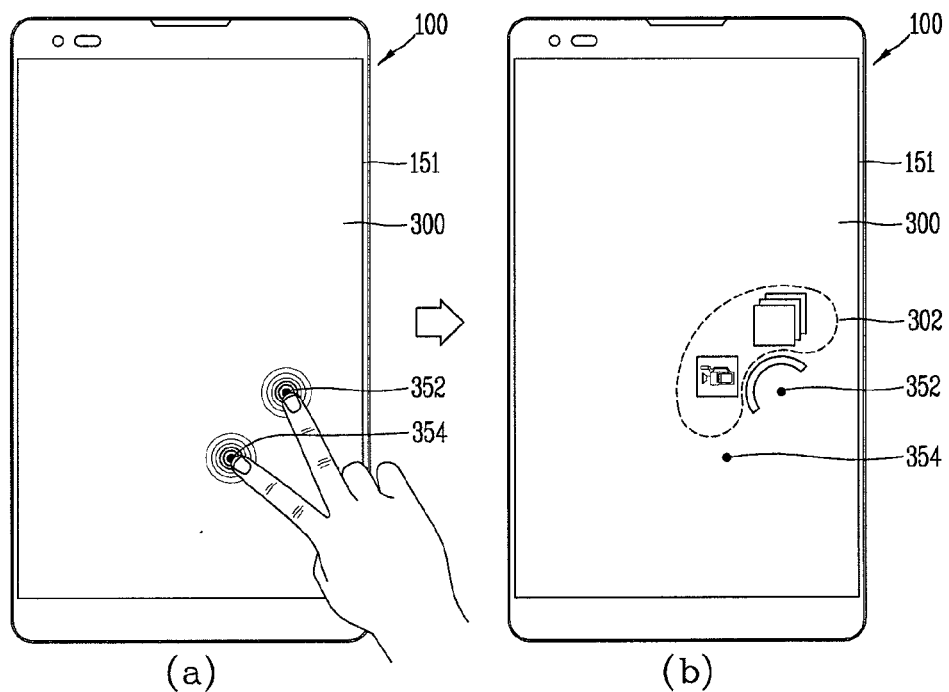
Figure 8C:
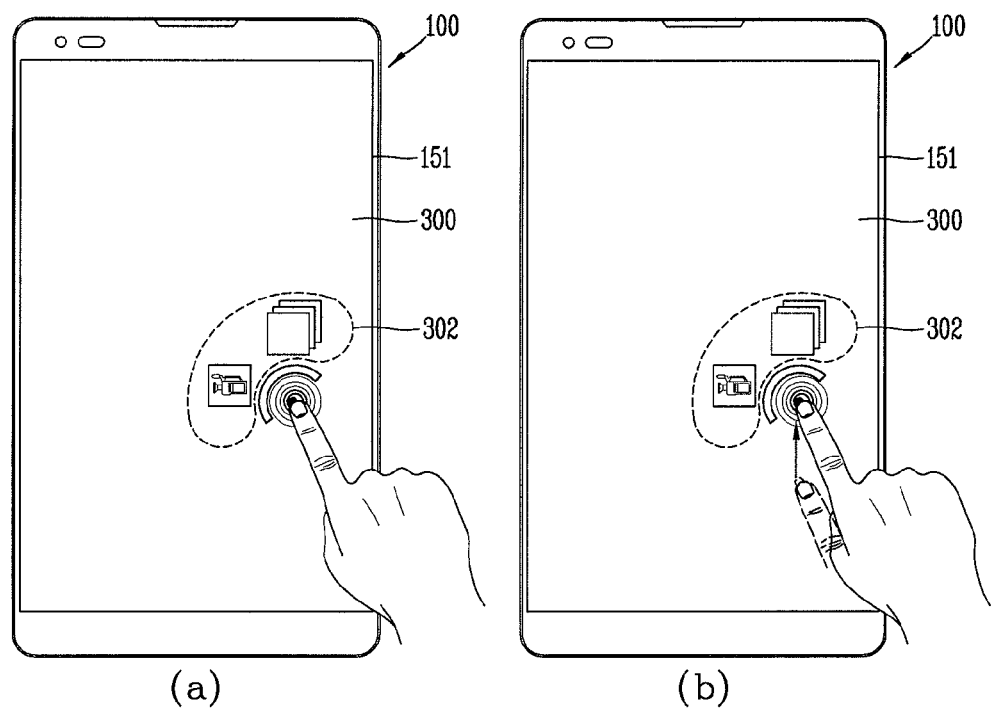

Next, FIGS. 8A to 8C are conceptual views illustrating another embodiment of switching from a second state in which outputting of a graphic object is limited to a first state in which a graphic object is output. In the second state in which outputting of a graphic object to the preview image 300 output to the display unit 151 is limited, and when touches are sensed at a plurality of points of the display unit 151, the controller 180 can switch the state of the display unit 151 from the second state to the first state in which the graphic object 302 related to the image capturing function overlaps with the preview image 300. Here, switching the state of the display unit 151 from the second state to the first state may refer to outputting the graphic object.

Further, when the plurality of points include first and second touches, and the controller 180 can output the graphic object to the vicinity of a touch point of at least one among the first and second touches. In an embodiment of the present invention, when touches are sensed on a plurality of points 352 and 354 of the display unit 151 as illustrated in (a) of FIG. 8A, the controller 180 can output a graphic object 302 relating to the image capturing function to the vicinity of a touch point of any one touch 352 among the first touch 352 and the second touch 354 corresponding to the plurality of sensed points as illustrated in (b) of FIG. 8A.

Here, the output graphic object 302 relating to the image capturing function may relate to types of touches sensed on the plurality of points. In more detail, when touches sensed on a plurality of points of the display unit 151 correspond to any one (for example, a long touch) of pre-set types of touches, the graphic object 302 cab be output. Further, the output graphic object 302 may be a plurality of objects. When any one of the plurality of graphic objects 30 is selected (or touched), the plurality of graphic objects 302 may disappear. Thereafter, when a touch corresponding to any one (for example, a long touch) of pre-set types of touches is sensed on one point, rather than a plurality of points, the controller 180 can capture an image through a function corresponding to a graphic object selected (or touched) by the user.

For example, as illustrated in (a) of FIG. 8A, when a plurality of touches are sensed in a pre-set manner (long touch type), a graphic object can be output to the vicinity of the touch point of the at least one touch 352 among the plurality of touches 352 and 354 as illustrated in (b) of FIG. 8A. The user can select any one (bust shot) of the output graphic objects. Thereafter, as illustrated in (a) of FIG. 5B, when a touch corresponding to a pre-set type (long touch type) is sensed on one point, the controller 180 can capture an image through a function (bust shot) corresponding to the selected graphic object.

In another embodiment, as illustrated in (a) of FIG. 8B, when touches are sensed on a plurality of points 352 and 354 of the display unit 151, as illustrated in (b) of FIG. 8B, the controller 180 can output a graphic object 302 relating to the image capturing function to the vicinity of the touch point of the at least one touch 352 among the first touch 352 and the second touch 354 corresponding to the plurality of sensed points.

Further, the graphic object 302 relating to the output image capturing function may relate to a type of touches sensed on the plurality of points. In more detail, when the touches sensed on the plurality of points of the display unit 151 are sensed as any one type (for example, a drag touch applied in a pre-set direction) of touches, the controller 180 can output a graphic object. The graphic object may be a plurality of objects. When any one of the plurality of graphic objects is selected, the output graphic object may disappear. Thereafter, when a touch applied according to any one (for example, a drag touch applied in a pre-set direction) of the pre-set types of touches is sensed on one point, the controller 180 can capture an image through a function corresponding to the selected graphic object.

For example, as illustrated in (a) of FIG. 8B, when a plurality of touches are sensed in a pre-set manner (for example, a drag touch applied in a leftward direction), a graphic object can be output to the vicinity of the touch point of the at least one touch 352 among the plurality of touches 352 and 354 as illustrated in (b) of FIG. 8A. The user can select any one (for example, a timer) among the output graphic objects. In this instance, the controller 180 can determine the function (for example, the timer) corresponding to the selected graphic object, as a function to be performed when one touch, rather than a plurality of touches, is sensed as a pre-set type (for example, a drag touch applied in a leftward direction).

Thereafter, as illustrated in FIG. 5C, when a touch corresponding to the pre-set type (a drag touch applied in a leftward direction) is sensed on one point, the controller 180 can capture an image through the function (timer) corresponding to the selected graphic object. In another embodiment, although touches are not sensed on a plurality of points, the controller 180 can switch a state of the display unit 151 from the second state to the first state. Namely, when a pre-set type of touch is sensed on one point, the controller 180 can output the graphic object relating to the image capturing function to the vicinity of the touch point of the sensed touch.

For example, when a pre-set type of touch (for example, a long touch) is sensed in a region on which the preview image 300 is output as illustrated in (a) of FIG. 8C, the controller 180 can output the graphic object 302 relating to image capturing to the vicinity of the sensed touch as illustrated in (a) of FIG. 8C, rather than immediately capturing a video with respect to the preview image as illustrated in (b) of FIG. 5B or rather than adjusting focus as illustrated in (b) of FIG. 6B. Thereafter, when any one of the plurality of graphic objects 302 is selected according to a user request, the controller 180 can execute a function (for example, burst shot) corresponding to the selected graphic object (for example, a bust shot icon).

As illustrated in (b) of FIG. 8C, when a drag touch extending from a touch applied to any one point in the region on which the preview image 300 is output is maintained at one point (long touch), the controller 180 can output the graphic object 302 relating to image capturing to the vicinity of the any one point where the drag touch is maintained. As described above, in the mobile terminal according to an embodiment of the present invention, even in the second state, the mobile terminal 100 can be switched to the first state through a simple manipulation.

Also, when a pre-set type of touches are sensed on a plurality of points, a graphic object for setting an image capturing function to be performed when the pre-se type of touch is sensed on one point may be output. Thus, even without a graphic object, the user can easily associate the image capturing function corresponding to his or her desired type of touch, and easily execute the associated image capturing function by applying the touch again.

Hereinafter, a method of providing an additional function with respect to a captured image after the image is captured in the mobile terminal according to an embodiment of the present invention will be described in detail. In particular, FIGS. 9A to 9E are conceptual views illustrating a method of checking images captured in the second state in which outputting of a graphic object is limited.

As illustrated in (a) of FIG. 9A, in the second state, when a pre-set touch is sensed in a region on which the preview image 300 is output, the preview image 300 can be captured. Thereafter, as illustrated in (b) of FIG. 9A, the controller 180 can output a thumbnail 400 with respect to the captured image to one region of the region on which preview image 300 is output. The thumbnail 400 may overlap with the preview image 300.

Further, the thumbnail 400 may be a thumbnail with respect to most recently captured image. Also, the thumbnail 400 may disappear when a pre-set period of time has lapsed or according to a user request. When a short touch is sensed on the thumbnail 400, the controller 400 can enter a gallery for outputting an image stored in the memory 170.

In addition, with the thumbnail 400 output, when a pre-set type of touch (for example, a long touch) is applied to the thumbnail 400 as illustrated in (c) of FIG. 9A, the controller 180 can output a captured image 500 corresponding to the thumbnail 400 to the region in which the preview image 300 is output as illustrated in (d) of FIG. 9A. The thumbnail 400 may overlap with the preview image 300.

Also, as illustrated in (d) of FIG. 8A, the thumbnail 400 with respect to the captured image and thumbnails 401 and 402 with respect to images which were captured earlier than the most recently captured image 500 and stored in the memory may be output together to the captured image 500 output in an overlapping manner. Also, the controller 180 can output a trash can graphic object 600 executing a function of deleting a captured image to the display unit 151.

The controller 180 can also determine whether to output at least one among the thumbnails 400, 401, and 402 and the trash can graphic object 600 according to conditions or according to circumstances. For example, as illustrated in (d) of FIG. 9A, while a long touch is maintained, the controller 180 can output at least one among the thumbnails 400, 401, and 402 and the trash can graphic object 600 to the display unit 151. Also, when releasing of the long touch is sensed, the controller 180 can switch a state of the display unit 151 to the second state such that only the preview image 300 is output as illustrated in (a) of FIG. 9A.

Figure 9B:
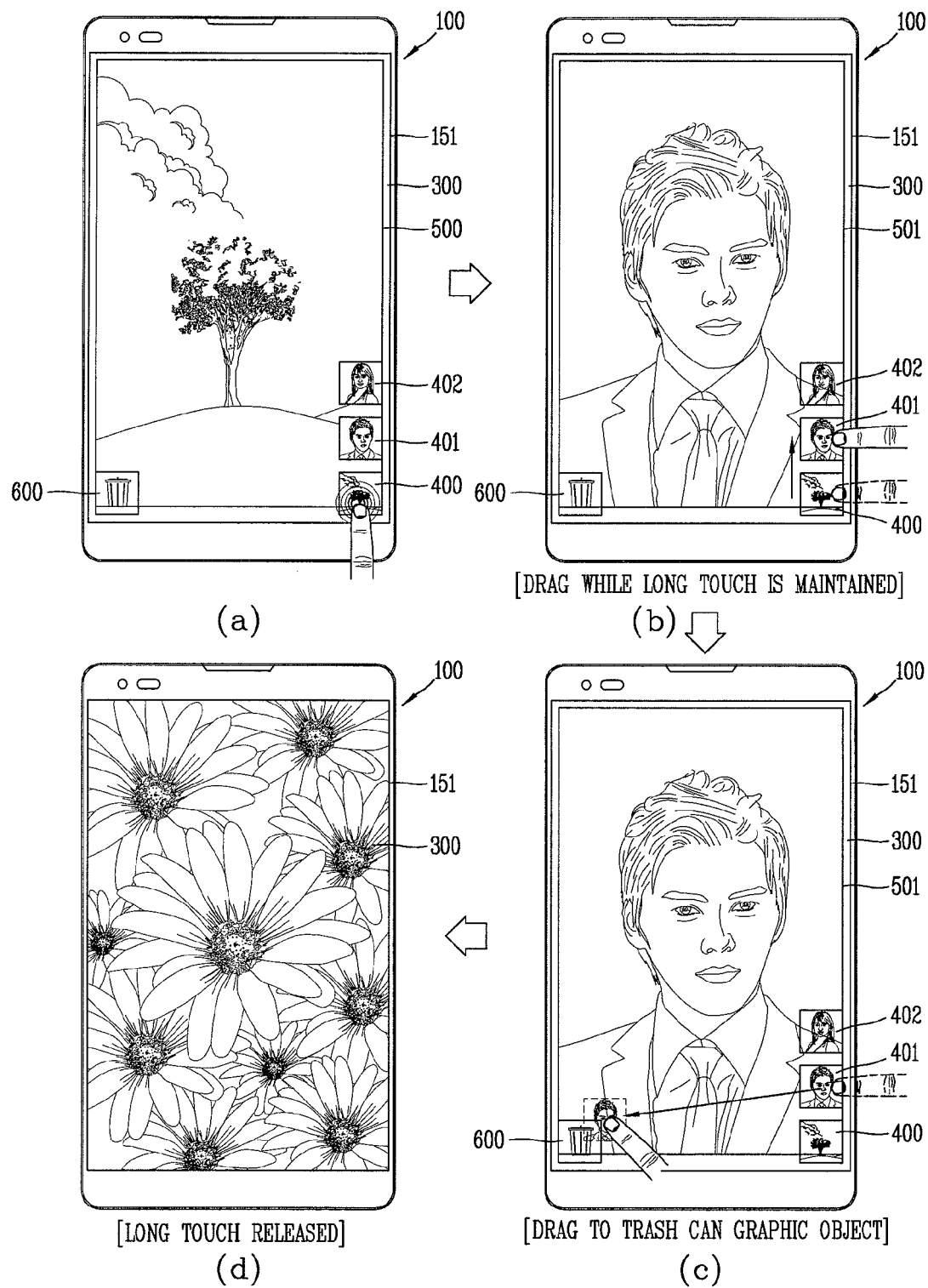

As illustrated in (a) of FIG. 9B, when a long touch is applied to the thumbnail 400 with respect to the captured image, the controller 180 can output the image 500 corresponding to the thumbnail 400 to the region in which the preview image 300 is output, in an overlapping manner. Thereafter, as illustrated in (b) of FIG. 9B, when a touch extending from the applied long touch is sensed on the thumbnail 401 with respect to the previously captured image, the controller 180 can switch the output image 500 to an image 501 corresponding to the thumbnail 401 on which the touch extending from the long touch is sensed.

In other words, when the long touch is maintained and extends from the first thumbnail 400 to the second thumbnail 401, the controller 180 can switch the image 500 corresponding to the first thumbnail 400 to the image 501 corresponding to the second thumbnail and outputs the image 501 to the display unit 151.

As illustrated in (c) of FIG. 9B, with the long touch sensed in the thumbnail 401 maintained, when a drag touch formed as the long touch extends from the thumbnail 401 to the trash can graphic object is sensed, the previously captured image 501 corresponding to the long touch-sensed thumbnail 401 may be deleted. Here, the thumbnail 401 may be managed as separate data from the original image 501.

In this instance, when the long touch-sensed thumbnail 401 is dragged to the trash can graphic object 600, the controller 180 can delete both the thumbnail 401 and the original image 501 corresponding to the thumbnail 401. Here, in addition to the case in which both the thumbnail 401 and the original image corresponding to the thumbnail are deleted together, only any one of the thumbnail 401 and the original image corresponding to the thumbnail may be deleted.

For example, when a long touch on any one 401 of the plurality of thumbnails 400, 401, and 402 is sensed, and when a touch extending from the thumbnail 401 on which the long touch is selectively sensed to the trash can graphic object 600 is sensed, the controller 180 can delete the selected thumbnail 401 and the previously captured image 501 corresponding to the selected thumbnail 401 from the memory unit.

When a long touch is released in any one of the states illustrated in (a), (b), and (c) of FIG. 9B, the controller 180 can return the state of the display unit 151 to the second state in which outputting of a graphic object is limited as illustrated in (d) of FIG. 9B. In addition, in an embodiment of the present invention, an image previously stored in the memory may be output even before the preview image is captured, as well as after the preview image is captured.

In more detail, in a state in which outputting of a graphic object relating to the image capturing function is limited, when a pre-set type of touch is sensed, the controller 180 can output a thumbnail with respect to an already captured image to the display unit. In this instance, at least one thumbnail may be output. The thumbnail may be output by a pre-set type of touch applied to a pre-set region. The pre-set region may be a region on which the thumbnail is to be output.

At least one region (hereinafter, referred to as a 'thumbnail region') to which the thumbnail is to be output may be positioned in at least a portion of the region on which the preview image is output. Namely, the controller 180 can allocate at least a portion of the region in which the preview image is output, as the thumbnail region. The thumbnail region may be set when an application or software was created or may be set according to a user request.

Figure 9C:
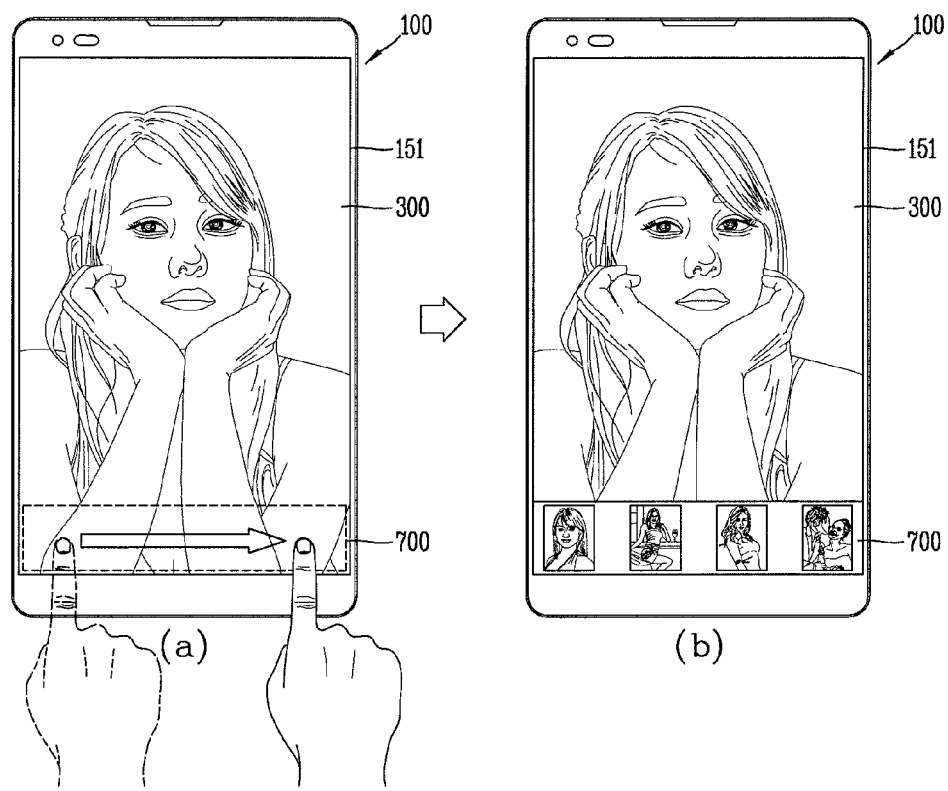

As illustrated in (a) of FIG. 9C, the controller 180 can set at least one region 700 (thumbnail region) for outputting a thumbnail. Thereafter, when a pre-set type of touch is sensed in the thumbnail region, the controller 180 can output at least one thumbnail 400 with respect to an image stored in the memory 170 to the thumbnail region 700 as illustrated in (b) of FIG. 9C. With at least one thumbnail 400 output, when a touch (short touch) on any one of the output thumbnails 400 is sensed, the controller 180 can enter a gallery for outputting an image stored in the memory 170.

Further, with the thumbnails 400 output, when a touch (long touch) on any one of the output thumbnails 400 is sensed, the controller 180 can provide control to perform such a function as described above with reference to FIGS. 9A and 9B.

In addition, a display size and the number of the output thumbnails may be determined based on the area of a touch sensed on the display unit 151. Also, the thumbnail region 700 may be determined based on the area of a touch sensed on the display unit 151. In more detail, the controller 180 can sense the area of a touch sensed on the display unit 151. Based on the area, the controller 180 can adjust a size of at least one region (thumbnail region) for outputting a thumbnail.

For example, a size of the thumbnail region may be proportional to the area of the touch sensed on the display unit 151. The controller 180 can determine at least one among the number and a display size of the output thumbnail according to the size of the thumbnail region, and output thumbnail(s) to the thumbnail based on the determined number and display size of the thumbnail(s). For example, as illustrated in (a) of FIG. 9D, when the area of a touch sensed in the thumbnail region 700 is narrow, the controller 180 can adjust (for example, reduce) the size of the thumbnail region 700 and output the thumbnail 400 based on the size of the adjusted thumbnail region 700.

Figure 9D:
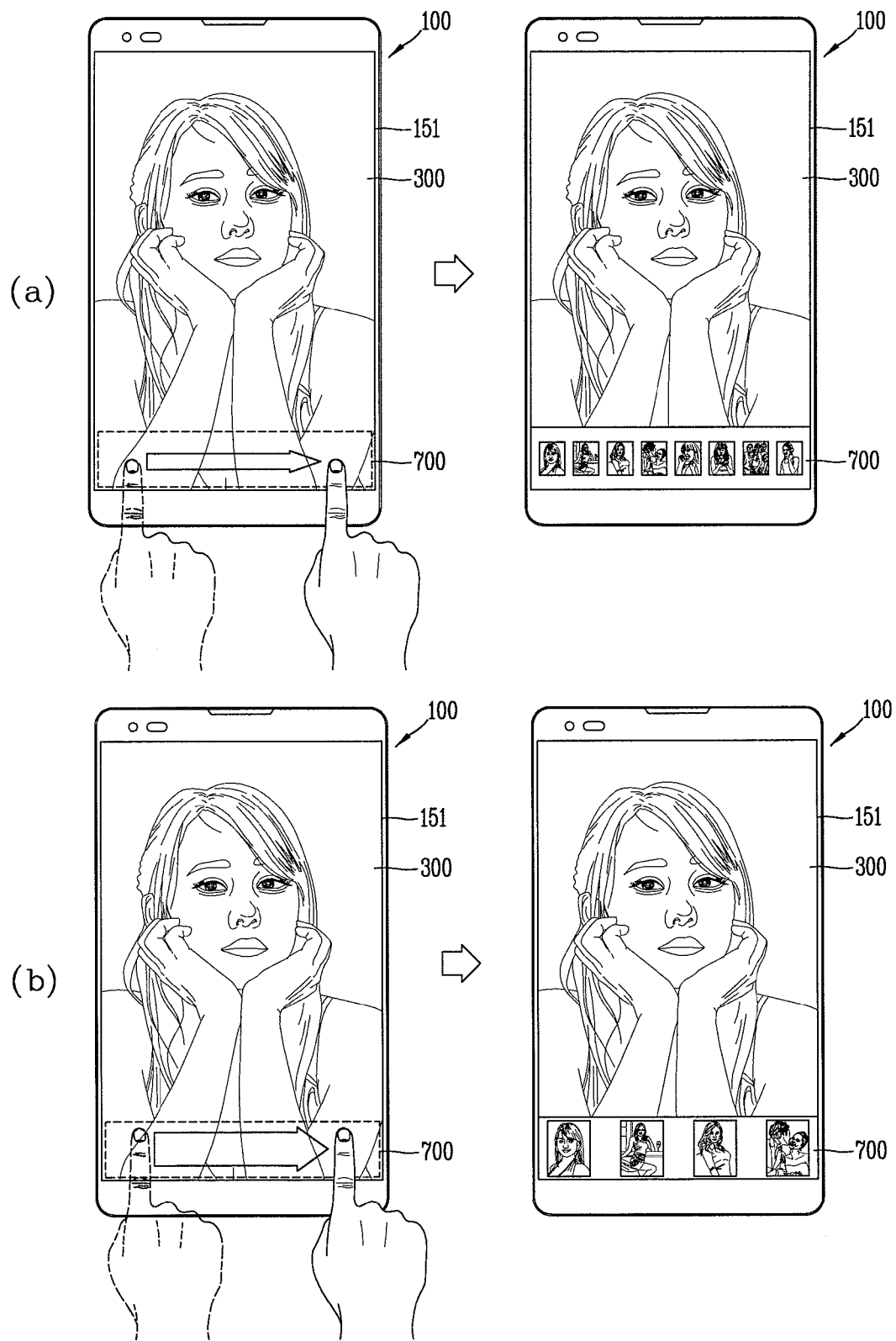

As illustrated in (b) of FIG. 9D, when the area of a touch sensed in the thumbnail region 700 is large, the controller 180 can adjust the size of the thumbnail region 700 to a size corresponding to the area and output the thumbnail 400 based on the adjusted size of the thumbnail region 700. When (a) and (b) of FIG. 9D are compared, (a) has a narrow touch area, relative to (b), and thus, a larger number of thumbnails having a small size may be output, while (b) has a large touch area, relative to (a), a smaller number of thumbnails having a large size may be output. Through this configuration, in an embodiment of the present invention, in a state in which outputting of a graphic object is limited, the user's needs for checking an image stored in the memory are satisfied even before a preview image is captured.

In addition, in an embodiment of the present invention, in the second state in which outputting of a graphic object is limited, a thumbnail stored in the memory may be output using an image analysis function. In more detail, when a pre-set type of touch is sensed on a subject included in a preview image, the controller 180 can output a thumbnail regarding an image obtained by capturing the subject corresponding to the sensed touch.

Figure 9E:
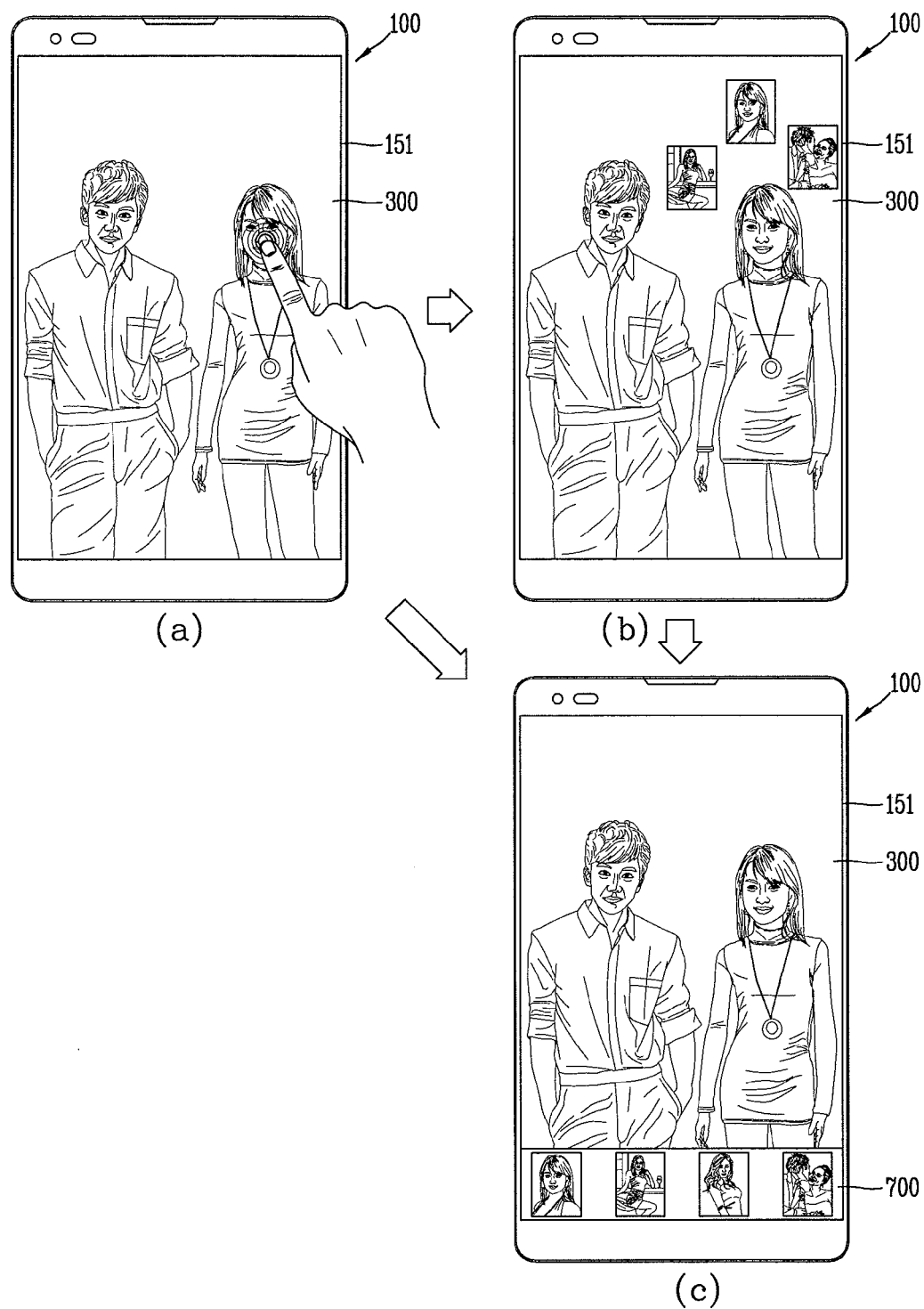

For example, as illustrated in (a) of FIG. 9E, when a pre-set type of touch (for example, long touch) is sensed on a subject output to the preview image 300, the controller 180 can perform image analysis on the subject. Based on the image analysis results, the controller 180 can extract an image corresponding to the results from images stored in the memory 170, and output the extracted image to the display unit 151. In this instance, the controller 180 can output the extracted image to the vicinity of the region in which the pre-set type of touch has been sensed or to a pre-set region (a region for outputting a thumbnail).

Through this configuration, in an embodiment of the present invention, even when outputting of a graphic object is limited, the image relating to the subject included in the preview image may be output. Thus, in an embodiment of the present invention, the captured image of the subject can be easily checked through a simple manipulation, and the user needs for capturing images of various figures of a subject is satisfied.

As described above, in the mobile terminal according to an embodiment of the present invention, a thumbnail for checking a captured image may be output, and the captured image may be checked and deleted using the thumbnail. Thus, since the user may check and delete the captured image even in the second state in which a graphic object is not output, user convenience can be increased.

Hereinafter, another embodiment in which an image capturing function is performed in the second state in which outputting of a graphic object is limited will be described in detail. In particular, FIGS. 10A to 10D are conceptual views illustrating a method of performing an image capturing function in the second state in which outputting of a graphic object is limited.

Figure 10A:
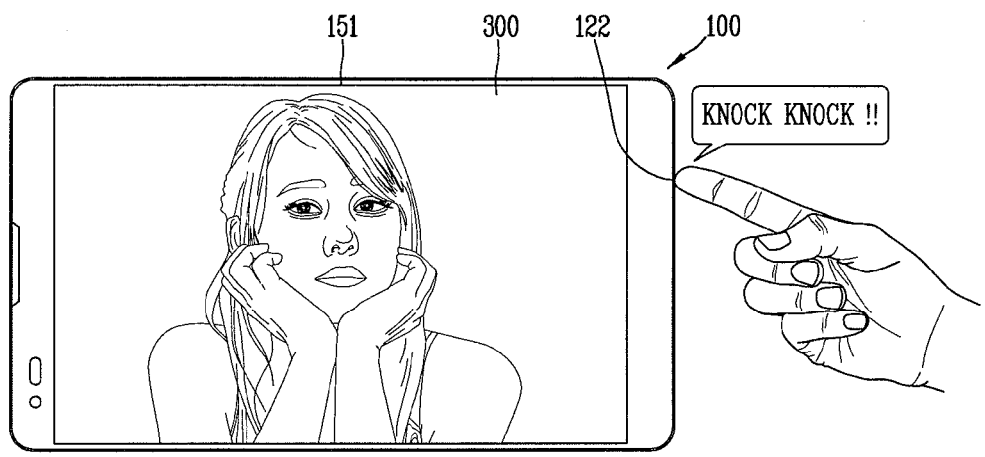
FIGS. 10A to 10D are conceptual views illustrating a method of performing an image capturing function in the second state in which outputting of a graphic object is limited.
Figure 10B:
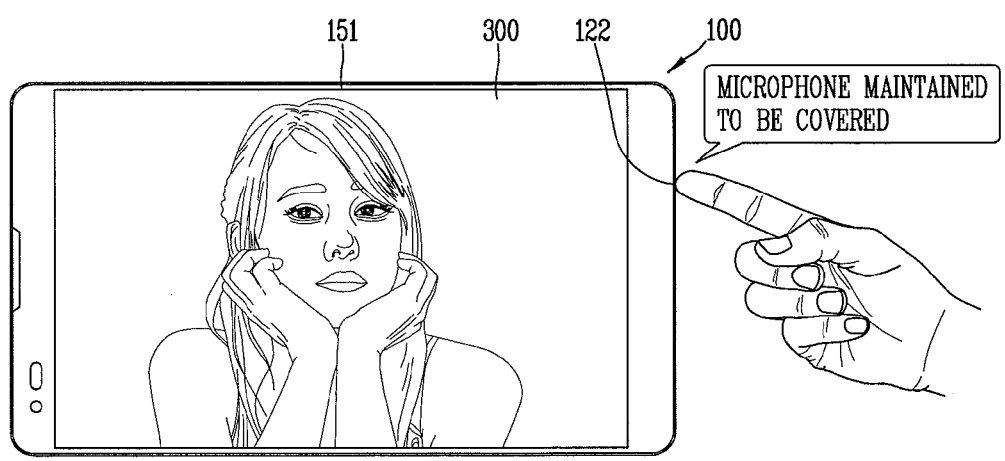

The controller 180 can perform image capturing on a preview image in the second state by using a different hardware configuration provided in the mobile terminal. For example, when a pre-set type of touch is applied to the microphone 122 of the mobile terminal, the controller 180 can perform image capturing on the preview image 300 output in the second state. When tapping or a pre-set type of touch is sensed on the microphone 122 as illustrated in FIG. 10A, of when the microphone 122 is covered to block noise as illustrated in FIG. 10B, the controller 180 can perform image capturing on the preview image 300 displayed on the display unit.

Figure 10C:
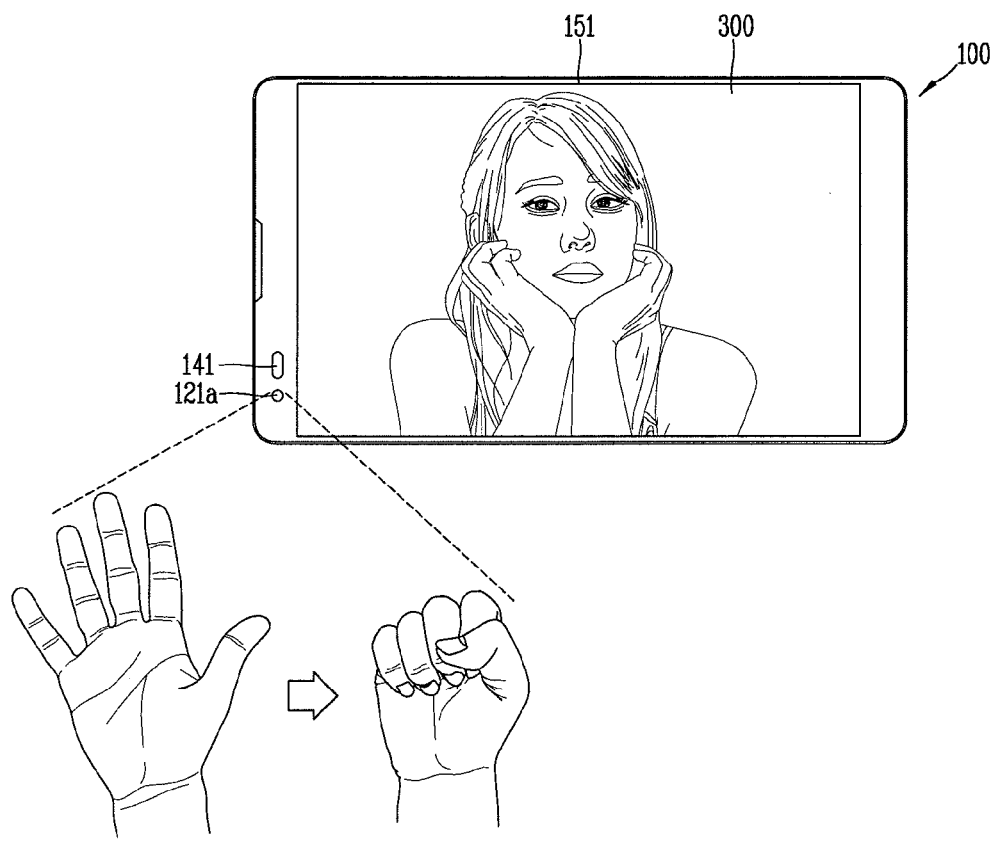

In another example, as illustrated in FIG. 10C, the controller 180 can sense a user's motion through the camera unit 121*a* and execute an image capturing function on the preview image 300 based on the sensed motion. Further, the controller 180 can recognize a user's face, as well as a user's motion, through the camera 121*a* and perform image capturing on the preview image 300.

Figure 10D:
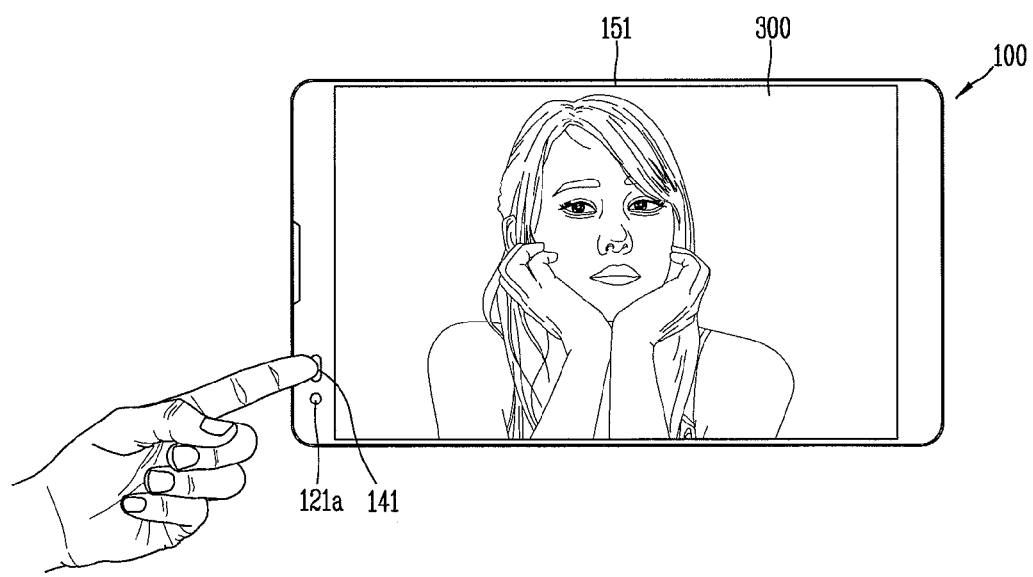

Also, the controller 180 can execute the image capturing function on the preview image 300 based on a user's motion sensed through the proximity sensor 141. The user's motion may include a motion of covering the proximity sensor 141 for a pre-set period of time, or the like, as illustrated in FIG. 10D.

In addition, the embodiment of the present invention as described above may be installed as a basic function of a mobile terminal when the mobile terminal is released or may be provided in the form of an application that can be downloaded through an external server using wireless communication. Thus, when a downloaded application is installed in the mobile terminal, the functions according to the embodiment of the present invention may be provided in the mobile terminal.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves (e.g., transmission via the Internet).

The mobile terminal according to the embodiments of the present invention is not limited in its application of the configurations and methods, but the entirety or a portion of the embodiments can be selectively combined to be configured into various modifications.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication processor configured to perform wireless communication;
a camera configured to obtain an image;
a touch screen configured to display a same preview image corresponding to the image obtained through the camera; and
a controller configured to:
control the touch screen to operate in any one of a first state in which a plurality of graphic objects relating to image capturing functions are displayed overlapping a subject obtained through the camera within the same preview image and a second state in which at least two of the plurality of graphic objects are not displayed while the same preview image is displayed, based on a touch input applied to a specific graphic object capable of selecting the first state or the second state, among the plurality of graphic objects,
control the camera to capture the same preview image in response to a touch input applied to one of the plurality of graphic objects when the touch screen is operated in the first state, and
transition from the first state and enter into the second state based on the touch input applied to the specific graphic object displayed in the first state and control the camera to capture the same preview image in response to a single touch input applied to the same preview image in an area on the preview image that represents the subject obtained through the camera and the area does not include any of the plurality of graphic objects of the first state when the touch screen is operated in the second state.

2. The mobile terminal of claim 1, wherein when the touch screen is in the second state, the controller is further configured to execute different functions based on different pre-set types of touches sensed in a region on which the same preview image is displayed, and not display any of the plurality of graphic objects associated with the first state while in the second state.

3. The mobile terminal of claim 2, wherein the controller is further configured to control the camera to capture a still image of the same preview image based on a first pre-set type of touch and to capture a video of the same preview image based on a second pre-set type of touch different from the first pre-set type of touch.

4. The mobile terminal of claim 3, wherein the first pre-set type of touch is any one among a plurality of touches applied in different movement directions, and the plurality of touches are associated with different image capturing modes, respectively, and
wherein the controller is further configured to execute the image capturing function on the same preview image in an image capturing mode among the different image capturing modes associated with the sensed first pre-set type of touch.

5. The mobile terminal of claim 4, wherein the first pre-set type of touch is any one of a drag touch applied in a first direction and a drag touch applied in a second direction different from the first direction,
wherein the drag touch applied in the first direction is associated with a first image capturing mode and the drag touch applied in the second direction is associated with a second image capturing mode different from the first image capturing mode, and
wherein the controller is further configured to execute the image capturing function on the same preview image in the first or second image capturing modes associated with the direction of the applied drag touch.

6. The mobile terminal of claim 3, wherein the controller is further configured to capture the same preview image as a still image when the first pre-set type of touch is a short touch, and capture a video of the image obtained through the camera when the second pre-set type of touch is a long touch.

7. The mobile terminal of claim 1, wherein the controller is further configured to adjust a focus of the same preview image based on a region where the touch input is applied, in response to the touch input being applied to the same preview image when the touch screen is operated in the first state, and
wherein the touch input that adjusts the focus of the same preview image when the touch screen is operated in the first state is a same type of touch input as the single touch input that captures the same preview image when the touch screen is operated in the second state.

8. The mobile terminal of claim 1, wherein the controller is further configured to adjust a focus of the same preview image based on at least one of a starting point and an ending point of a drag touch on the same preview image, in response to the drag touch being applied in a pre-set movement direction in the second state.

9. The mobile terminal of claim 1, wherein the controller is further configured to switch a state of the touch screen from the second state to the first state, when a multi-touch input applied to the same preview image includes touches sensed on a plurality of points on the touch screen in the second state.

10. The mobile terminal of claim 9, wherein the touches on the plurality of points include a first touch and a second touch, and
wherein the controller is further configured to display the graphic object to a vicinity of a touch point of at least one among the first and second touches.

11. A method of controlling a mobile terminal, the method comprising:
obtain an image through a camera of the mobile terminal;
displaying, via a touch screen of the mobile terminal, a same preview image corresponding to the image obtained through the camera of the mobile terminal;
controlling, via a controller of the mobile terminal, the touch screen to operate in any one of a first state in which a plurality of graphic objects relating to image capturing functions are displayed overlapping a subject obtained through the camera within the same preview image and a second state in which at least two of the plurality of graphic objects are not displayed while the same preview image is displayed, based on a touch input applied to a specific graphic object capable of selecting the first state or the second state, among the plurality of graphic objects; and
controlling, via the controller, the camera to capture the same preview image in response to a touch input applied to one of the plurality of graphic objects when the touch screen is operated in the first state; and
controlling, via the controller, the touch screen to transition from the first state and enter into the second state based on the touch input applied to the specific graphic object displayed in the first state and the camera to capture the same preview image in response to a single touch input applied to the same preview image in an area on the preview image that represents the subject obtained through the camera and the area does not include any of the plurality of graphic objects of the first state when the touch screen is operated in the second state.

12. The method of claim 11, further comprising:
executing different functions based on different pre-set types of touches sensed in a region on which the same preview image is displayed when the touch screen is in the second state.

13. The method of claim 12, further comprising:
controlling the camera to capture a still image of the same preview image based on a first pre-set type of touch and to capture a video of the same preview image based on a second pre-set type of touch different from the first pre-set type of touch.

14. The method of claim 13, wherein the first pre-set type of touch is any one among a plurality of touches applied in different movement directions, and the plurality of touches are associated with different image capturing modes, respectively, and
wherein the method further comprises executing the image capturing function on the same preview image in an image capturing mode among the different image capturing modes associated with the sensed first pre-set type of touch.

15. The method of claim 14, wherein the first pre-set type of touch is any one of a drag touch applied in a first direction and a drag touch applied in a second direction different from the first direction,
wherein the drag touch applied in the first direction is associated with a first image capturing mode and the drag touch applied in the second direction is associated with a second image capturing mode different from the first image capturing mode, and
wherein the method further comprises executing the image capturing function on the same preview image in the first or second image capturing modes associated with the direction of the applied drag touch.

16. The method of claim 13, further comprising:
capturing the same preview image as a still image when the first pre-set type of touch is a short touch; and
capturing a video of the image obtained through the camera when the second pre-set type of touch is a long touch.

17. The method of claim 11, further comprising:
adjusting a focus of the same preview image based on a region in response to the touch input being applied to the same preview image when the touch screen is operated in the first state,
wherein the touch input that adjusts the focus of the same preview image when the touch screen is operated in the first state is a same type of touch input as the single touch input that captures the same preview image when the touch screen is operated in the second state.

18. The method of claim 11, further comprising:
adjusting a focus of the same preview image based on at least one of a starting point and an ending point of a drag touch on the same preview image in response to the drag touch being applied in a pre-set movement direction in the second state.

19. The method of claim 11, further comprising:
switching a state of the touch screen from the second state to the first state when a multi-touch touch input applied to the same preview image includes touches sensed on a plurality of points on the touch screen in the second state.

20. The method of claim 19, wherein the touches on the plurality of points include a first touch and a second touch, and
wherein the method further comprises displaying the graphic object to a vicinity of a touch point of at least one among the first and second touches.

* * * * *